(12) United States Patent
Fujishima et al.

(10) Patent No.: US 9,399,856 B2
(45) Date of Patent: Jul. 26, 2016

(54) HYDRAULIC WORKING MACHINE

(75) Inventors: Kazuo Fujishima, Tsuchiura (JP);
Yusuke Kajita, Ushiku (JP); Mitsuo Sonoda, Kasumigaura (JP); Masatoshi Hoshino, Tsuchiura (JP); Akira Nakayama, Tsuchiura (JP); Junji Yamamoto, Kasumigaura (JP); He Bao, Ushiku (JP); Seiji Ishida, Hitachinaka (JP); Shiro Yamaoka, Hitachi (JP); Takashi Okada, Hitachinaka (JP)

(73) Assignee: HITACHI CONSTRUCTION MACHINERY CO., LTD., Tokyo (JP)

(*) Notice: Subject to any disclaimer, the term of this patent is extended or adjusted under 35 U.S.C. 154(b) by 346 days.

(21) Appl. No.: 14/110,808

(22) PCT Filed: May 24, 2012

(86) PCT No.: PCT/JP2012/063370
§ 371 (c)(1),
(2), (4) Date: Oct. 9, 2013

(87) PCT Pub. No.: WO2012/161276
PCT Pub. Date: Nov. 29, 2012

(65) Prior Publication Data
US 2014/0020375 A1   Jan. 23, 2014

(30) Foreign Application Priority Data
May 25, 2011   (JP) .................................. 2011-117443

(51) Int. Cl.
*F15B 21/14*   (2006.01)
*E02F 9/20*   (2006.01)
(Continued)

(52) U.S. Cl.
CPC ................ *E02F 9/2025* (2013.01); *B60K 6/46* (2013.01); *B60K 17/28* (2013.01); *B60W 20/00* (2013.01);
(Continued)

(58) Field of Classification Search
CPC .. E02F 9/2075; E02F 9/2217; Y02T 10/6226; F15B 21/14

USPC ..................................................... 60/414, 431
See application file for complete search history.

(56) References Cited

U.S. PATENT DOCUMENTS 6,708,787 B2 * 3/2004 Naruse ..................... B60K 6/12
180/53.8
6,959,241 B2 * 10/2005 Itow ....................... B60K 6/485
123/361

(Continued)

FOREIGN PATENT DOCUMENTS

JP   2002-275945 A   9/2002
JP   2005081973 A *  3/2005

(Continued)

OTHER PUBLICATIONS

International Preliminary Report on Patentability received in International Application No. PCT/JP2012/063370 dated Dec. 5, 2013.

*Primary Examiner* — Thomas E Lazo
(74) *Attorney, Agent, or Firm* — Mattingly & Malur, PC

(57) ABSTRACT

A hydraulic working machine has an assist electric motor connected to an engine and a hydraulic pump. The emissions of air pollutants in the exhaust gas from the engine are minimized regardless of fluctuations in the load torque of the hydraulic pump. A specific revolution speed suitable for reducing the emissions of air pollutants is stored, and an engine is controlled using the specific revolution speed as a target revolution speed. The absorption torque of a hydraulic pump is subjected to high-pass filtering whereby a high-frequency component devoid of a trend component is obtained. Target assist torque is computed from the high-frequency component, and the assist electric motor is subjected to power running/generation control accordingly. A specific output torque range suitable for reducing the emissions of air pollutants is stored, and the target assist torque is corrected so that the trend component does not exceed the specific output torque range.

9 Claims, 27 Drawing Sheets

(51) Int. Cl.
- *B60W 20/00* (2016.01)
- *E02F 9/22* (2006.01)
- *B60K 6/46* (2007.10)
- *B60K 17/28* (2006.01)
- *F02D 41/14* (2006.01)
- *F02D 31/00* (2006.01)
- *B60W 10/06* (2006.01)
- *B60W 10/08* (2006.01)
- *B60W 30/188* (2012.01)

(52) U.S. Cl.
CPC ............... *B60W 20/16* (2016.01); *E02F 9/20* (2013.01); *E02F 9/2075* (2013.01); *E02F 9/2296* (2013.01); *F02D 31/001* (2013.01); *F02D 41/1406* (2013.01); *F15B 21/14* (2013.01); *B60W 10/06* (2013.01); *B60W 10/08* (2013.01); *B60W 30/1888* (2013.01); *B60W 2300/17* (2013.01); *B60W 2710/0644* (2013.01); *B60Y 2200/412* (2013.01); *F02D 2250/18* (2013.01); *F02D 2250/36* (2013.01); *F02D 2250/38* (2013.01); *F15B 2211/20515* (2013.01); *F15B 2211/20523* (2013.01); *F15B 2211/20546* (2013.01); *F15B 2211/633* (2013.01); *F15B 2211/6316* (2013.01); *F15B 2211/88* (2013.01); *Y02T 10/6217* (2013.01); *Y02T 10/6286* (2013.01)

(56) References Cited

U.S. PATENT DOCUMENTS

| | | | |
|---|---|---|---|
| 7,143,859 B2 * | 12/2006 | Ohtsukasa | E02F 9/2075 60/431 |
| 8,424,302 B2 * | 4/2013 | Morinaga | B66F 9/22 60/431 |
| 8,567,549 B2 * | 10/2013 | Kang | B60K 6/48 180/305 |
| 8,606,442 B2 * | 12/2013 | Kang | B60K 6/485 180/53.8 |
| 8,612,102 B2 * | 12/2013 | Ohhigashi | E02F 9/2075 414/687 |
| 2002/0125052 A1 | 9/2002 | Naruse et al. | |

FOREIGN PATENT DOCUMENTS

| | | |
|---|---|---|
| JP | 2009-216058 A | 9/2009 |
| JP | 4512283 A | 5/2010 |
| JP | 2010-265708 A | 11/2010 |
| JP | 4633813 A | 11/2010 |

* cited by examiner

FIG.15
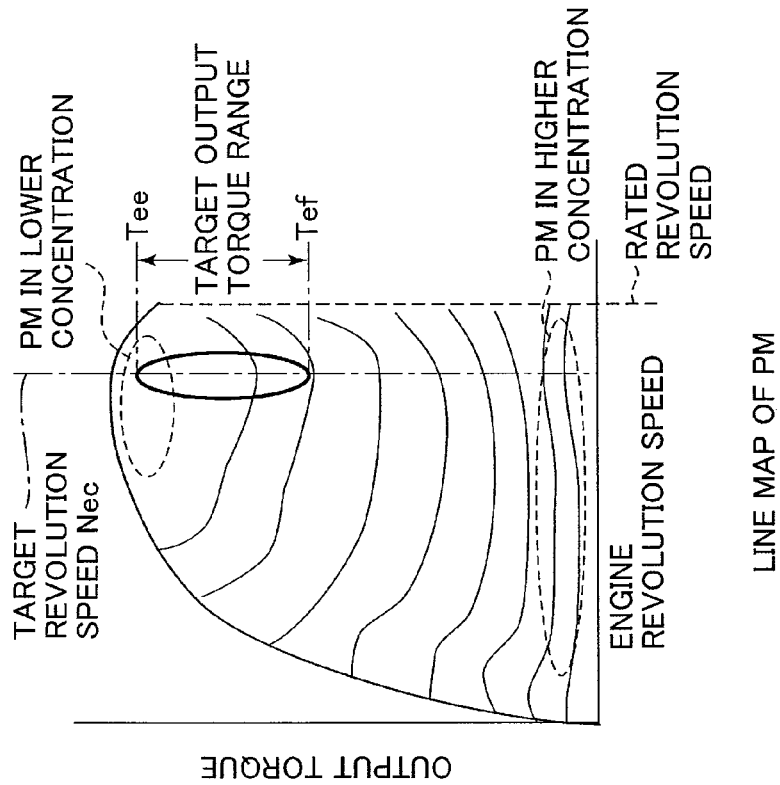
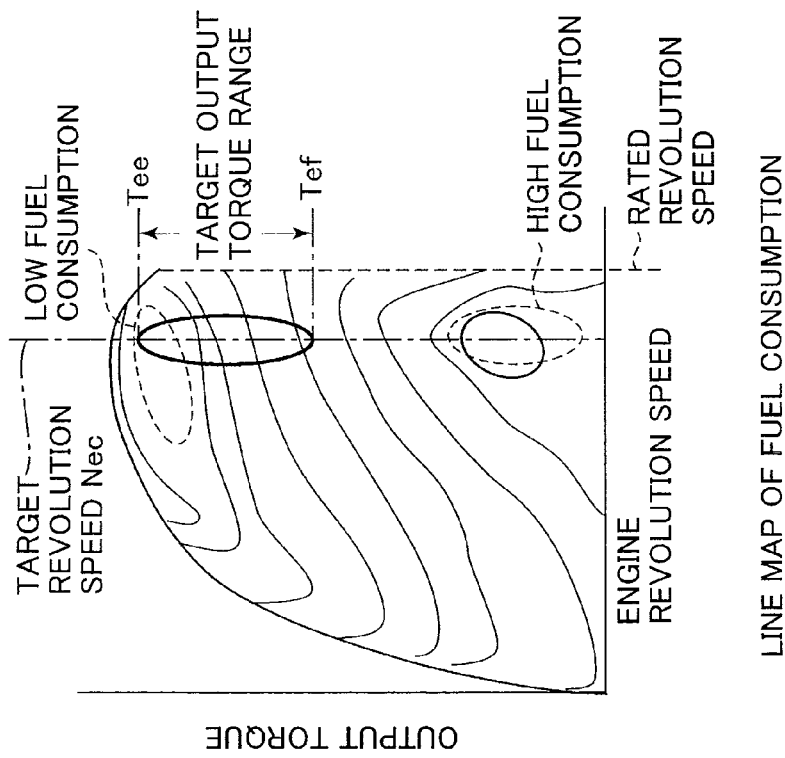

FIG. 19 (FOURTH EMBODIMENT)

(FIFTH EMBODIMENT)

(SIXTH EMBODIMENT)

LINE MAP OF PM

HYDRAULIC WORKING MACHINE

TECHNICAL FIELD

The present invention relates to hydraulic working machines including hydraulic shovels, wheel loaders and others. More particularly, the invention relates to a hybrid-driven hydraulic working machine equipped with an assist electric motor driven by an engine as well as by an electric storage device.

BACKGROUND ART

In recent years, the regulations on exhaust gases from engines have become stricter. To deal with these regulations, engine manufacturers and other makers have been trying in particular to reduce particulate matter (PM) and nitrogen oxides (NOx) contained in exhaust gases. A large number of advanced combustion control techniques have been developed. On the other hand, there have been developed techniques for performing the processes of capturing and purifying particulate matter (PM) and nitrogen oxides (NOx) by installing an exhaust gas after-treatment device such as DPF (diesel particulate filter) and a urea SCR system interposingly between the engine and the muffler. These techniques are combined as needed with advanced combustion control techniques to address the exhaust gas regulations that are getting stricter all the time.

However, the above-mentioned exhaust gas after-treatment devices such as the DPF (diesel particulate filter) and urea SCR system were not originally attached to the engine system. Usually, these exhaust gas after-treatment devices are complex in structure and use expensive materials. For example, the catalyst used in the PDF is platinum. Furthermore, the urea SCR system needs to be provided with a tank for storing urea and a urea injecting device. For these reasons, engine systems equipped with the exhaust gas after-treatment device can be considerably more costly than engine-only systems.

Meanwhile, in the field of hydraulic working machine such as hydraulic shovels, there have been proposed and developed in recent years hybrid-driven hydraulic working machines equipped with an assist electric motor driven by an engine as well as by an electric storage device such as batteries acting as a drive source.

For example, the construction machine (hydraulic working machine) proposed in Patent Document 1 is equipped with an engine-driven electric motor so that excess engine output is saved as electric energy for energy conservation. When engine output is insufficient, the saved electric energy is released to drive the electric motor so as to maintain required pump absorption torque. Patent Document 1 explains that this structure makes it possible to adopt a small engine having rated output equivalent to the average horsepower necessary for the construction machine to do its work and that fuel efficiency can be improved and exhaust CO2 emissions can be reduced accordingly.

The working machine proposed in FIG. 6 of Patent Document 2 is structured to generate hydraulic pressure with a hydraulic pump driven by an engine and an electric motor. The rate of increase in engine output is set to a predetermined value. An upper limit of engine output obtained from the predetermined rate of increase is compared with the demanded power acquired from the hydraulic output demanded of the hydraulic pump. If the comparison shows that the demanded power exceeds the upper limit of engine output, the exceeding output is compensated for by electric motor output. Patent Document 2 explains that even if hydraulic load is raised suddenly, this structure performs control to prevent engine load from getting abruptly raised thus keeping the operating conditions of the engine within an appropriate range and that the drop of combustion efficiency, generation of black exhaust, and engine shutdown can be avoided accordingly.

PRIOR ART LITERATURE

Patent Document

Patent Document 1: Japanese Patent No. 4512283
Patent Document 2: Japanese Patent No. 4633813

SUMMARY OF THE INVENTION

Problem to be Solved by the Invention

Unlike automobiles, hydraulic working machines such as hydraulic shovels are subject to extreme fluctuations in engine load. The load can fluctuate from 0 to 100 percent of the rated engine torque instantaneously. It follows that no matter how advanced engine combustion control is, there are limits to stably reducing the emissions of particulate matter (PM) and nitrogen oxides (NOx) by a predetermined amount under all working conditions for hydraulic working machines. Usually, when there occur large fluctuations in engine load and revolution speed, the emissions of particulate matter (PM) and nitrogen oxides (NOx) tend to become higher than in the steady state. Thus in order to reduce the particulate matter (PM) and nitrogen oxides (NOx) contained in the exhaust gases released into the atmosphere, it is necessary to enlarge the capacity of the DPF and the volume of the tank in the urea SCR system, or to install a urea injection control system fine-tuned to address fuel injection status of the engine in the urea SCR system. In any case, the costs involved will be high.

The hydraulic working machine described in Patent Document 1 and the one proposed in FIG. 6 of Patent Document 2 each subject the electric motor to power running control to compensate for insufficient engine output torque incurred when the torque demanded of the hydraulic pump (pump absorption torque) exceeds engine output torque, whereby engine load torque is prevented from getting abruptly raised. However, there is no control associating the target revolution speed and target output torque of the engine with regions in which the emissions of air pollutants such as particulate matter (PM) and nitrogen oxides (NOx) are to be reduced. Thus, although the proposed machines are effective in reducing fuel consumption, they fail to suitably reduce the emissions of air pollutants such as particulate matter (PM) and nitrogen oxides (NOx).

An object of the present invention is to provide a hybrid-driven hydraulic working machine having an assist electric motor connected to an engine and a hydraulic pump, the hydraulic working machine being structured in such a manner that the emissions of air pollutants in the exhaust gas from the engine are minimized regardless of fluctuations in the load torque of the hydraulic pump, that the rising cost of installing an exhaust gas after-treatment device is lowered, and that the reliability of the engine is enhanced.

(1) In achieving the above-stated object, the present invention provides a hybrid-driven hydraulic working machine including: an engine; a hydraulic pump driven rotatably by the engine; an assist electric motor connected to the engine and the hydraulic pump; a plurality of actuators driven by hydraulic fluid delivered by the hydraulic pump; and a plurality of operating devices each having an operating member, the operating devices operating the actuators by outputting an operation signal reflecting the operation of the operating member. The hybrid-driven hydraulic working machine further includes: a storage device that stores a specific revolution speed of the engine suitable for reducing the emissions of air pollutants contained in exhaust gas from the engine; an engine revolution speed setting device that sets the specific revolution speed stored in the storage device as a target revolution speed for the engine; an engine revolution speed control device that controls the revolution speed of the engine based on the target revolution speed for the engine; and an electric motor control device that computes differential torque between the absorption torque of the hydraulic pump and target output torque of the engine and that subjects the assist electric motor to power running control and generation control in accordance with the differential torque.

As described above, a specific revolution speed of the engine suitable for reducing the emissions of air pollutants contained in the exhaust gas from the engine is set as a target revolution speed for the engine, and the revolution speed of the engine is controlled based on the target revolution speed. With the engine revolution speed kept at a revolution speed for lowering the emissions of air pollutants, it is possible to reduce the air pollutant emissions. Moreover, while the engine revolution speed is being controlled in this manner, the assist electric motor is subjected to power running control and generation control in accordance with the differential torque between the load torque bearing on the engine and the target output torque for the engine. This makes it possible to prevent abrupt fluctuations in the load torque of the hydraulic pump from being transmitted unmitigated to the engine when the load torque of the hydraulic pump (pump absorption torque) exceeds engine output torque or when the load torque of the hydraulic pump (pump absorption torque) becomes lower than the engine output torque. The output torque of the engine is controlled to stay equivalent to the target output torque for the engine. As a result, the emissions of air pollutants contained in the exhaust gas can be minimized.

Also, the engine revolution speed of the engine and the assist electric motor are controlled to reduce the emissions of air pollutants. This makes it possible to downsize or eliminate the exhaust gas after-treatment device such as the DPF and urea SCR system, whereby the rising cost of installing the exhaust gas after-treatment device can be lowered.

Furthermore, when the assist electric motor is subjected to power running control and generation control, the fluctuations in the load bearing on the engine are reduced. This offers the additional benefit of prolonging the service life of the engine and increasing the reliability of the engine.

(2) With regard to what is described in paragraph (1) above, the electric motor control device may preferably include a pump absorption torque acquiring device that acquires the absorption torque of the hydraulic pump, and a filter device that separates the absorption torque of the hydraulic pump acquired by the pump absorption torque acquiring device into a trend component as target torque for the engine and other component. The electric motor control device may use the other component separated by the filter device as the differential torque, and subject the assist electric motor to power running control and generation control in such a manner that the trend component serves as the target output torque for the engine.

With this structure, as explained in paragraph (1) above, the assist electric motor is subjected to power running/generation control to keep the engine output torque equivalent to the target output torque for the engine. This minimizes the emissions of air pollutants contained in the exhaust gas, lowers the rising cost of installing the exhaust gas after-treatment device, and improves the reliability of the engine.

(3) With regard to what is described in paragraph (2) above, the filter device may preferably be a high-pass filter that removes the trend component from the absorption torque of the hydraulic pump acquired by the pump absorption torque acquiring device.

With this structure, the differential torque is obtained from the absorption torque of the hydraulic pump acquired by the pump absorption torque acquiring device. As explained in paragraph (1) above, the assist electric motor is subjected to power running/generation control to keep the engine output torque equivalent to the target output torque for the engine. This minimizes the emissions of air pollutants contained in the exhaust gas, lowers the rising cost of installing the exhaust gas after-treatment device, and improves the reliability of the engine.

(4) Also with regard to what is described in paragraph (2) above, the storage device may preferably store a specific revolution speed and a specific output torque range of the engine suitable for reducing the emissions of air pollutants contained in the exhaust gas from the engine; the electric motor control device may further include a torque distribution correcting device that corrects the target torque for the assist electric motor in such a manner that the target output torque for the engine does not exceed the specific output torque range stored in the storage device; and the electric motor control device may subject the assist electric motor to power running control and generation control based on the target torque for the assist electric motor corrected by the torque distribution correcting device.

With this structure, as described in paragraph (1) above, control of the engine revolution speed and power running/generation control of the assist electric motor can suppress the emissions of air pollutants. Furthermore, the emissions of air pollutants can be lowered by performing control in such a manner that the output torque of the engine is kept within a specific output torque range suitable for reducing the emissions of air pollutants.

(5) With regard to what is described in paragraph (1) or (4) above, the exhaust gas from the engine contains particulate matter (PM) and nitrogen oxides, and the storage device may preferably store a specific revolution speed of the engine, or a specific revolution speed and a specific output torque range of the engine suitable for reducing one of a plurality of factors including the emissions of particulate matter (PM), the emissions of nitrogen oxides (NOx), the total emissions of particulate matter (PM) and nitrogen oxides (NOx), a combination of the emissions of particulate matter (PM) with fuel consumption, a combination of the emissions of nitrogen oxides (NOx) with fuel consumption, and a combination of the total emissions of particulate matter (PM) and nitrogen oxides (NOx) with fuel consumption.

With this structure, as described in paragraphs (1) and (4), power running/generation control of the assist electric motor can reduce the emissions of air pollutants. Furthermore, performing control to keep the revolution speed and output torque of the engine within a specific rotating speed and a specific output torque range can lower one of a plurality of factors including the emissions of particulate matter (PM), the emissions of nitrogen oxides (NOx), the total emissions of particulate matter (PM) and nitrogen oxides (NOx), a combination of the emissions of particulate matter (PM) with fuel consumption, a combination of the emissions of nitrogen oxides (NOx) with fuel consumption, and a combination of the total emissions of particulate matter (PM) and nitrogen oxides (NOx) with fuel consumption.

(6) Also with regard to what is described in paragraph (4) above, the exhaust gas from the engine contains particulate matter (PM) and nitrogen oxides, and the storage device may preferably store a plurality of combinations of the specific revolution speed and the specific output torque range of the engine suitable for reducing at least two of a plurality of factors including the emissions of particulate matter (PM), the emissions of nitrogen oxides (NOx), the total emissions of particulate matter (PM) and nitrogen oxides (NOx), a combination of the emissions of particulate matter (PM) with fuel consumption, a combination of the emissions of nitrogen oxides (NOx) with fuel consumption, and a combination of the total emissions of particulate matter (PM) and nitrogen oxides (NOx) with fuel consumption; and the hydraulic working machine may further include a switching device that selects for use one of the combinations of the specific revolution speed and the specific output torque range of the engine.

The engine revolution speed setting device may set the specific revolution speed of the combination selected by the switching device as the target revolution speed for the engine, and the torque distribution correcting device may correct the target torque for the assist electric motor in such a manner that the specific output torque range of the combination selected by the switching device is not exceeded.

With this structure, as explained in paragraph (4) above, when control is performed to reduce the emissions of air pollutants, it is possible to select the combination of a specific revolution speed and a specific output torque range of the engine suitable for lowering the factors that are optimal for addressing the regulations on the work environment and working area. Thus it is possible to perform engine control and electric motor control optimally fit for the regulations on the work environment and working area.

(7) Also with regard to what is described in paragraph (2) above, the pump absorption torque acquiring device may preferably include a torque detecting device that detects the absorption torque of the hydraulic pump, and a torque computing device that computes the absorption torque of the hydraulic pump based on detected values from the torque detecting device.

With this structure, it is possible to acquire accurate pump absorption torque and thereby perform control with precision.

(8) Also with regard to what is described in paragraph (2) above, the pump absorption torque acquiring device may preferably include a revolution detecting device that detects the actual revolution speed of the engine, and a torque computing device that estimates the absorption torque of the hydraulic pump based on the deviation between the actual revolution speed detected by the revolution detecting device and the target revolution speed.

With this structure, a highly versatile revolution speed detecting device may be used to acquire pump absorption torque. This makes it possible to configure the system inexpensively.

(9) Also with regard to what is described in paragraph (2) above, the pump absorption torque acquiring device may preferably include an operation signal detecting device that detects the operation signal output from the plurality of operating devices, and a torque computing device that predicts the absorption torque of the hydraulic pump based on the operation signal detected by the operation signal detecting device.

With this structure, a highly versatile operation signal detecting device may be used to acquire pump absorption torque. This makes it possible to configure the system inexpensively.

(10) In achieving the above-stated object, the present invention further provides a hybrid-driven hydraulic working machine including: an engine; a hydraulic pump driven rotatably by the engine; an assist electric motor connected to the engine and the hydraulic pump; a plurality of actuators driven by hydraulic fluid delivered by the hydraulic pump; and a plurality of operating devices each having an operating member, the operating devices operating the actuators by outputting an operation signal reflecting the operation of the operating member. The hybrid-driven hydraulic working machine further includes: a storage device that stores a specific revolution speed and specific output torque of the engine suitable for reducing the emissions of air pollutants contained in exhaust gas from the engine; an engine revolution speed setting device that sets the specific revolution speed stored in the storage device as a target revolution speed for the engine; an engine revolution speed control device that controls the revolution speed of the engine based on the target revolution speed for the engine; and an electric motor control device that computes the deviation between the absorption torque of the hydraulic pump and the specific output torque stored in the storage device and that subjects the assist electric motor to power running control and generation control in accordance with the deviation.

As described above, a specific output torque suitable for reducing the emissions of air pollutants is set as target output torque for the engine in order to control the engine revolution speed. At the same time, the assist electric motor is subjected to power running control and generation control in accordance with the deviation between the absorption torque of the hydraulic pump and specific output torque suitable for reducing the emissions of air pollutants. This allows engine output torque to be controlled while the specific output torque suitable for reducing the emissions of air pollutants is set as the target output torque. That in turn minimizes the emissions of air pollutants contained in the exhaust gas, lowers the rising cost of installing the exhaust gas after-treatment device, and increases the reliability of the engine.

(11) With regard to what is described in paragraph (10) above, the exhaust gas from the engine contains particulate matter (PM) and nitrogen oxides, and a specific revolution speed and specific output torque of the engine stored in the storage device may preferably be those suitable for reducing one of a plurality of factors including the emissions of particulate matter (PM), the emissions of nitrogen oxides (NOx), the total emissions of particulate matter (PM) and nitrogen oxides (NOx), a combination of the emissions of particulate matter (PM) with fuel consumption, a combination of the emissions of nitrogen oxides (NOx) with fuel consumption, and a combination of the total emissions of particulate matter (PM) and nitrogen oxides (NOx) with fuel consumption.

With this structure, control of the engine revolution speed and control of the engine output torque explained in paragraph (10) above may reduce one of a plurality of factors including the emissions of particulate matter (PM), the emissions of nitrogen oxides (NOx), the total emissions of particulate matter (PM) and nitrogen oxides (NOx), a combination of the emissions of particulate matter (PM) with fuel consumption, a combination of the emissions of nitrogen oxides (NOx) with fuel consumption, and a combination of the total emissions of particulate matter (PM) and nitrogen oxides (NOx) with fuel consumption.

Effect of the Invention

According to the present invention, it is possible to minimize the emissions of air pollutants contained in the exhaust gas.

Also, with the emissions of air pollutants thus reduced, it is possible to downsize or eliminate the exhaust gas after-treatment device such as the DPF and urea SCR system, whereby the rising cost of installing the exhaust gas after-treatment device can be lowered.

Furthermore, subjecting the assist electric motor to power running control and generation control reduces the fluctuations in the load bearing on the engine, so that the service life of the engine may be prolonged and the reliability of the engine may be improved.

BRIEF DESCRIPTION OF THE DRAWINGS

FIG. 15 is a diagrammatic view showing line maps of the emissions of particulate matter (PM) contained in the exhaust gas from the engine and the fuel consumption of the engine, each of the maps representing the correlations between the revolution speed and output torque of the engine.

MODE FOR CARRYING OUT THE INVENTION

Some embodiments of the present invention are explained below in reference to the accompanying drawings.

First Embodiment

Figure 1:
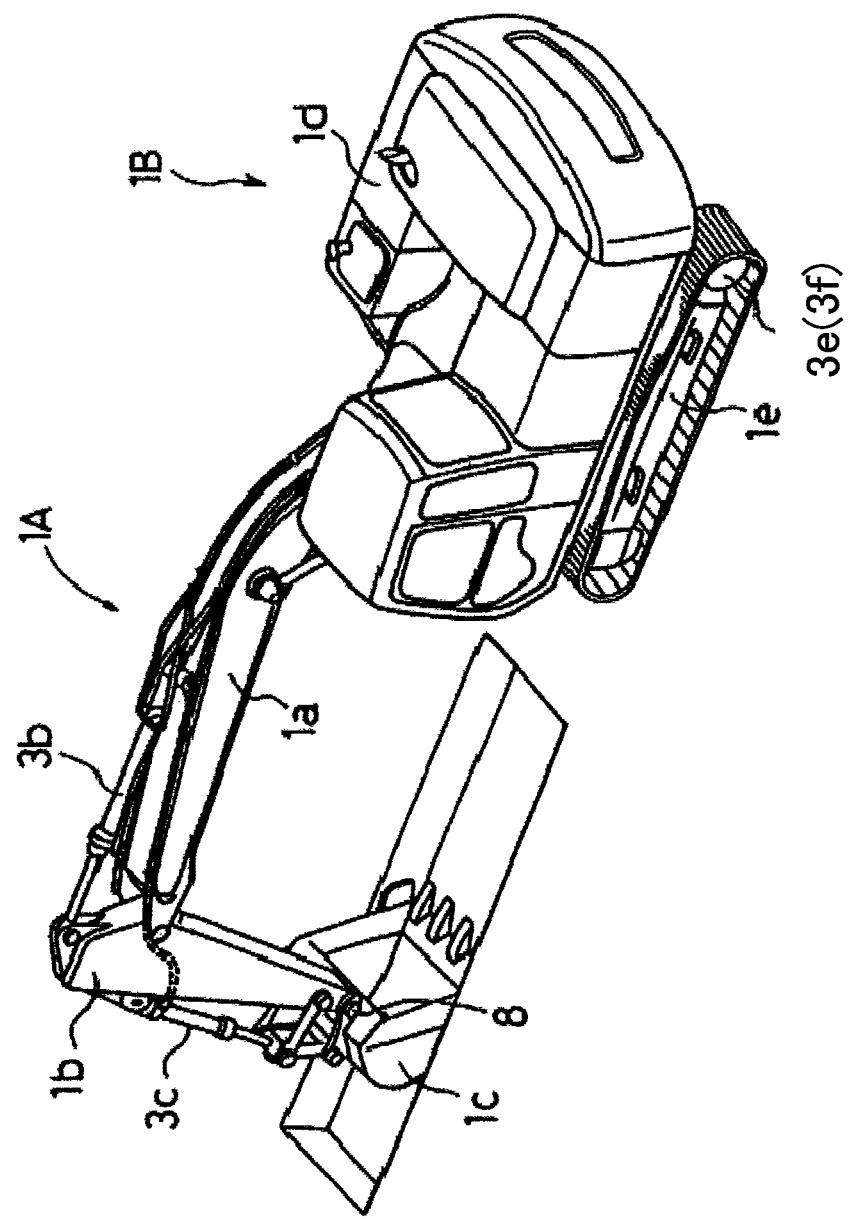
FIG. 1 is an external view of a hydraulic shovel (hydraulic working machine) as a first embodiment of the present invention.

FIG. 1 is an external view of a hydraulic shovel (hydraulic working machine) as the first embodiment of the present invention.

The hydraulic shovel is made up of a multi-jointed front device 1A composed of a boom 1a, arm 1b and a bucket 1c each rotating in the vertical direction, and a vehicle body 1B formed by an upper swing structure 1d and a lower track structure 1e, the base end of the boom 1a of the front device 1A being supported in a vertically rotatable manner by the front section of the upper swing structure 1d. The boom 1a, arm 1b, bucket 1c, upper swing structure 1d, and lower track structure 1e are driven, respectively, by a boom cylinder 3a, an arm cylinder 3b, a bucket cylinder 3c, a swing motor 16 (see FIG. 2), and left-hand and right-hand track motors 3e and 3f. The movements of the boom 1a, arm 1b, bucket 1c, and upper swing structure 1*d* are designated using hydraulic operation signals (control pilot pressures) from control lever devices 4*a* and 4*b* (see FIG. 2). The movements of the lower track structure 1*e* are designated using hydraulic operation signals (control pilot pressures) from a control pedal devices (not shown) for tracking.

Figure 2:
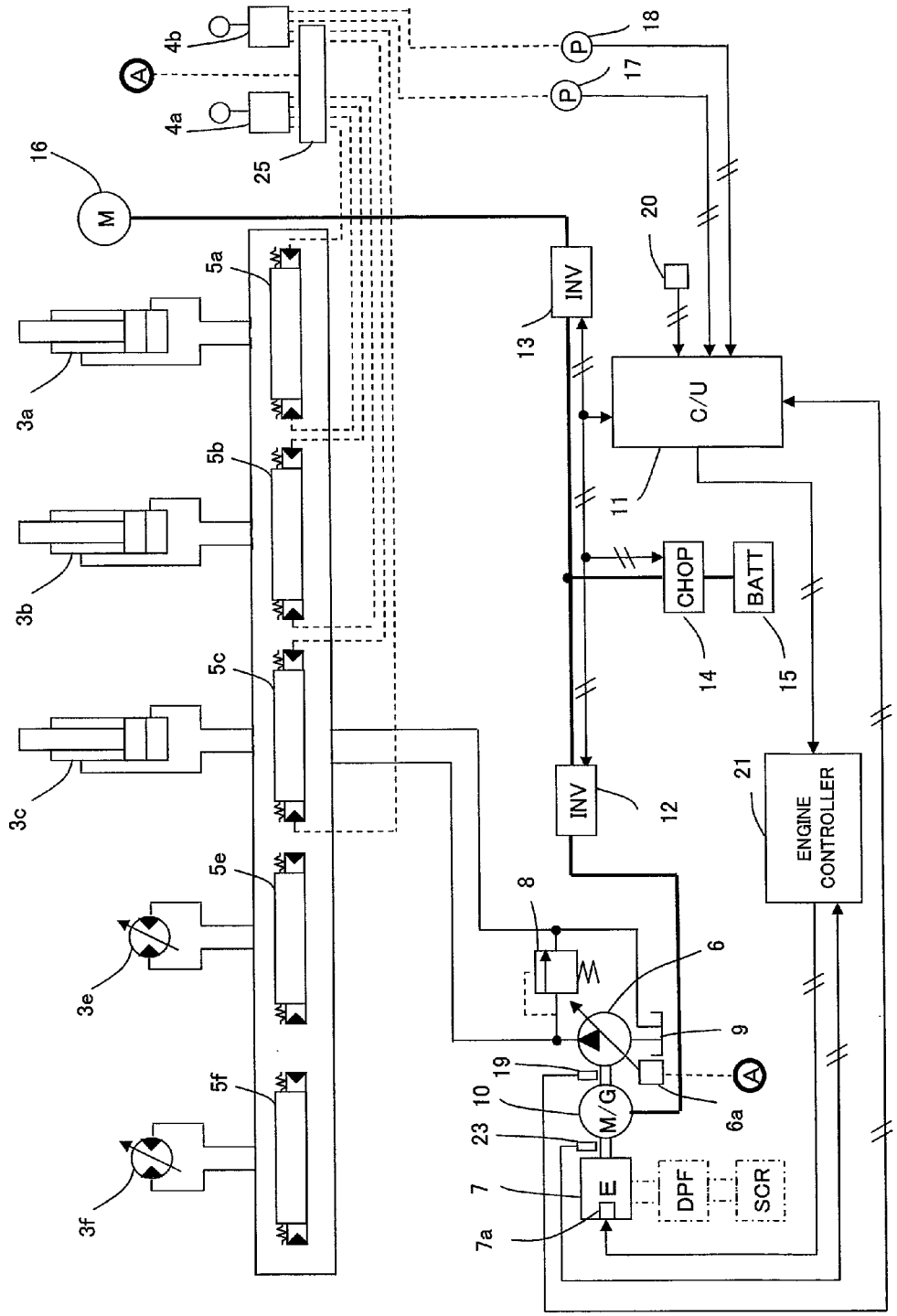
FIG. 2 is a block diagram of an actuator drive control system mounted on the hydraulic shovel.

FIG. 2 is a block diagram of an actuator drive control system mounted on the hydraulic shovel shown in FIG. 1.

In FIG. 2, the actuator drive control system of this invention includes the control lever devices 4*a* and 4*b*, control pedal devices (not shown) for tracking, spool type directional control valves 5*a* to 5*c*, 5*e* and 5*f*; a main hydraulic pump 6, an engine 7, a main relief valve 8, a tank 9, and a shuttle valve block 25.

The control lever devices 4*a* and 4*b* and the control pedal devices reduce the primary pressure generated by delivered fluid from a pilot pump (not shown) into a secondary pressure to generate a control pilot pressure (hydraulic operation signal) in accordance with the opening degrees of pressure reducing valves (remote control valves) attached to the control lever devices 4*a* and 4*b* and control pedal devices. The control pilot pressure is then led to pressure receiving units of the directional control valves 5*a* to 5*c*, 5*e* and 5*f*, whereby the directional control valves 5*a* to 5*c*, 5*e* and 5*f* are switched from their neutral positions illustrated. The directional control valves 5*a* to 5*c*, 5*e* and 5*f* may be, for example, open center type spool valves disposed in a center bypass line. Switched by the control pilot pressure, the directional control valves control the flow (direction and flow rate) of hydraulic fluid delivered by the hydraulic pump 6, whereby the drive of hydraulic actuators 3*a* to 3*c*, 3*e* and 3*f* is controlled. The hydraulic pump 6 is rotatably driven by the engine 7. In case of an excessive rise in the pressure inside hydraulic piping into which the delivered fluid from the hydraulic pump 6 is introduced, the relief valve 8 relieves the hydraulic fluid into the tank 9 to prevent an inordinate rise in the pressure within the hydraulic piping.

The shuttle valve block 25 selectively outputs the hydraulic operation signal of the highest pressure from among the hydraulic operation signals (control pilot pressures) generated by the control lever devices 4*a* and 4*b* other than those for designating swing operations, and from among the hydraulic operation signals generated by the control pedal devices (not shown).

The hydraulic pump 6 is a variable displacement type pump that has a regulator 6*a* operating on a positive control method. The hydraulic operation signal output by the shuttle valve block 25 is led to the regulator 6*a*. As is well known, the regulator 6*a* of the positive control method increases a swash plate tilting angle (displacement) of the hydraulic pump 6 when the hydraulic operation signal is raised by an increased operation amount (demanded flow rate) of the control levers and pedals (operating members) of the control lever devices 4*a* and 4*b* and control pedal devices, whereby the delivery flow rate of the hydraulic pump 6 is increased.

Alternatively, the regulator 6*a* of the hydraulic pump 6 may be one that operates on a negative control method whereby the tilting angle (displacement) of the hydraulic pump 6 is increased as the signal pressure input to the regulator 6*a* is lowered. In this case, a throttle is mounted on the most downstream portion of the center bypass line that leads to the tank 9 by way of the directional control valves 5*a* to 5*c*, 5*e* and 5*f*. The pressure at the inflow side of this throttle is taken as a signal pressure that is led to the regulator 6*a*. In the case where the throttle is mounted on the most downstream portion of the center bypass line, the pressure at the inflow side of the throttle drops when the flow rate through the center bypass throttle of the directional control valves 5*a* to 5*c*, 5*e* and 5*f* is lowered in response to an increased operation amount (demanded flow rate) of the control levers and pedals (operating members) of the control lever devices 4*a* and 4*b* and control pedal devices. Thus when the pressure at the inflow side of the throttle is input to the regulator 6*a* as a signal pressure, with the tilting angle (displacement) of the hydraulic pump 6 increased in response to a drop in the signal pressure, it is possible to raise the delivery flow rate of the hydraulic pump 6 in keeping with the increased operation amount of the operating members.

Alternatively, there may be adopted a load sensing control method whereby, with the directional control valves 5*a* to 5*c*, 5*e* and 5*f* composed of a closed type spool valve each, the delivery pressure of the hydraulic pump 6 is controlled to be higher than a maximum load pressure by a predetermined pressure level.

Also, the regulator 6*a* is provided with a known torque limitation control function for keeping the absorption torque of the hydraulic pump 6 from exceeding predetermined maximum torque by lowering the tilting angle (displacement) of the hydraulic pump 6 as the delivery pressure of the hydraulic pump 6 is increased.

The actuator drive control system of this embodiment further includes an assist electric motor 10, a vehicle body controller 11, inverters 12 and 13, a chopper 14, a battery 15, pressure sensors 17 and 18, a torque sensor 19, an engine control dial 20, a revolution sensor 23 for detecting the revolution speed of the engine 7, and an engine controller 21.

The assist electric motor 10 is connected between the hydraulic pump 6 and the engine 7. The assist electric motor 10 has the function of an electric generator that converts the power of the engine 7 into electric energy (electric power) to be output to the inverter 12, as well as the function of an electric motor that assists in driving the hydraulic pump 6 when driven by the electric energy (electric power) fed from the inverter 12.

When the assist electric motor 10 functions as an electric generator, the inverter 12 converts the AC power generated by the motor 10 into DC power to be output. When the assist electric motor 10 functions as an electric motor, the inverter 12 converts the DC power from the battery 15 into AC power to be supplied to the assist electric motor 10.

The inverter 13 converts the DC power generated by the assist electric motor 10 and output by the inverter 12 into AC power to be supplied to the swing motor 16. While at swing braking, the inverter 13 converts the AC power regenerated by the swing motor 16 acting as an electric generator into DC power to be output.

The battery 15 has its voltage regulated through the chopper 14 and supplies electric power to the inverters 12 and 13. The battery 15 also stores the electric energy generated by the assist electric motor 10 as well as electric energy coming from the swing motor 16.

The engine control dial 20 is operated by an operator to give the command of a basic revolution speed of the engine 7 reflecting the operator's intentions. The vehicle body controller 11 receives the command signal from the engine control dial 20, computes a target revolution speed based on the input command signal, and outputs the computed target revolution speed to the engine controller 21. The engine controller 21 computes the deviation between the target revolution speed from the vehicle body controller 11 and the actual revolution speed of the engine 7 detected by the revolution sensor 23, computes a target fuel injection amount based on the computed revolution speed deviation, and outputs a control signal reflecting the computed amount to an electronic governor 7*a* attached to the engine 7. The electronic governor 7a acting on that control signal causes the fuel equivalent to the target fuel injection amount to be injected into the engine 7. This allows the engine 7 to be controlled to maintain its target revolution speed.

The vehicle body controller 11 has a control computing circuit that performs the following controls regarding the assist electric motor 10 and swing motor 16.

(1) Drive Control of the Swing Motor 16

The pressure sensors 17 and 18 are connected to a pilot hydraulic line that conducts hydraulic operation signals for designating swing operations in the right and left direction from among the hydraulic operation signals generated by the control lever device 4b, and detects the swing-designating hydraulic operation signals. The vehicle body controller 11 receives detection signals (electric signals) from the pressure sensors 17 and 18 and performs drive control of the swing motor 16 in accordance with the detected hydraulic operation signals. Specifically, upon detecting a hydraulic operation signal designating a swing operation in the left direction, the vehicle body controller 11 performs generation control whereby the inverter 12 is controlled based on the detected hydraulic operation signal to let the assist electric motor 10 serve as an electric generator, and carries out power running control whereby the inverter 13 is controlled to drive the swing motor 16 thereby swinging the upper swing structure 1d in the left direction at a speed corresponding to the hydraulic operation signal. Upon detecting a hydraulic operation signal designating a swing operation in the right direction, the vehicle body controller 11 performs generation control whereby the inverter 12 is controlled based on the detected hydraulic operation signal to let the assist electric motor 10 serve as an electric generator, and carries out power running control whereby the inverter 13 is controlled to drive the swing motor 16 thereby swinging the upper swing structure 1d in the right direction at a speed corresponding to the hydraulic operation signal.

(2) Electric Storage Control of Recovered Electric Power

At swing braking, the vehicle body controller 11 performs generation control whereby the inverter 13 is controlled to let the swing motor 16 serve as an electric generator, thereby recovering electric energy from the swing motor 16 and storing the recovered electric energy into the battery 15.

(3) Control 1 of the Assist Electric Motor 10 (Electric Storage Management and Control of the Battery 15)

When the hydraulic load on the hydraulic pump 6 (pump absorption torque) is light and when the level of stored electricity in the battery 15 is low, the vehicle body controller 11 performs generation control whereby the inverter 12 is controlled to allow the assist electric motor 10 to serve as an electric generator generating excess electric power and to store the generated excess electric power into the battery 15. Conversely, when the hydraulic load on the hydraulic pump 6 (pump absorption torque) is heavy and when the level of stored electricity in the battery 15 is higher than a predetermined level, the vehicle body controller 11 performs power running control whereby the inverter 12 is controlled to allow the assist electric motor 10 to be supplied with electric power from the battery 15 and to allow the assist electric motor 10 serve as an electric motor assisting in driving the hydraulic pump 6. It should be noted that when the hydraulic load on the hydraulic pump 6 (pump absorption torque) is light and when the level of stored electricity in the battery 15 is low, control 1 is given priority.

(4) Control 2 of the Assist Electric Motor 10 (Torque Fluctuation Suppression Control)

The torque sensor 19 detects the load torque of the hydraulic pump 6 (pump absorption torque) that fluctuates in keeping with the fluctuations in the load bearing on the hydraulic actuators 3a to 3c, 3e and 3f of the hydraulic shovel. The vehicle body controller 11 receives a detection signal (electric signal) from the torque sensor 19 and, based on the detected load torque of the hydraulic pump 6, selectively performs either power running control allowing the assist electric motor 10 to serve as an electric motor, or generation control allowing the assist electric motor 10 to serve as an electric generator, thereby suppressing the output torque of the engine 7. This reduces the emissions of air pollutants (particulate matter (PM) and nitrogen oxides (NOx)) contained in the exhaust gas from the engine 7.

The detailed function of torque fluctuation suppression control performed by the vehicle body controller 11 is explained below.

Figure 3:
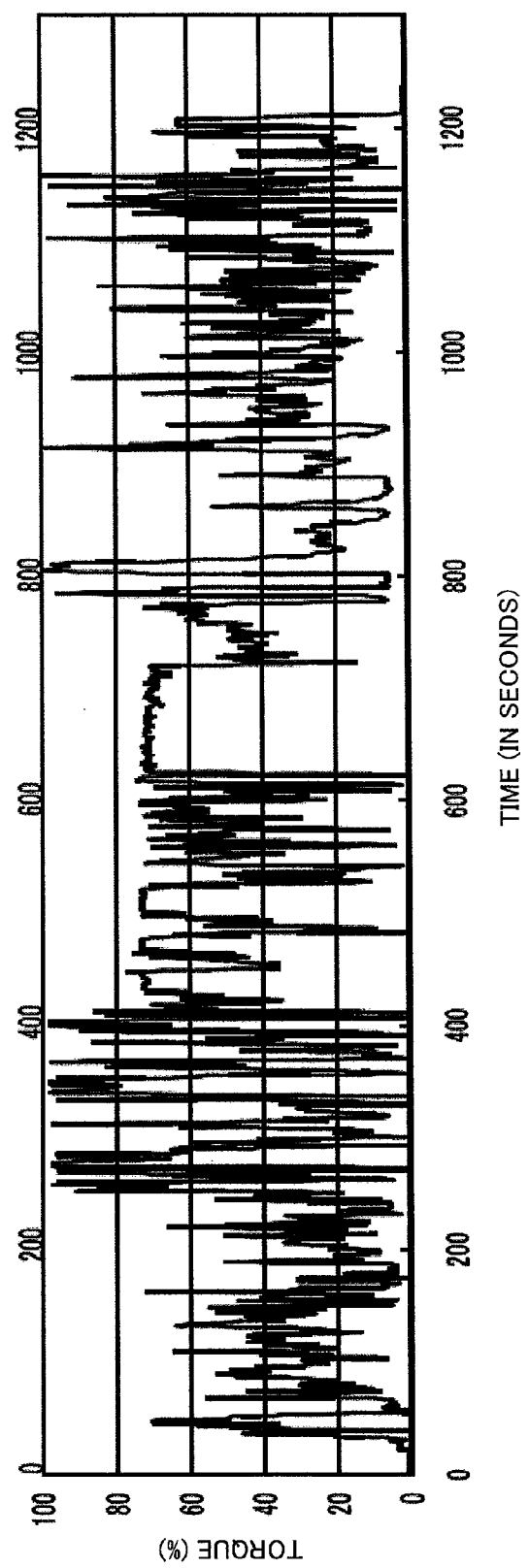
FIG. 3 is an illustration showing typical fluctuations in the load torque bearing on a hydraulic pump of an ordinary actuator drive control system which is devoid of an assist electric motor and of which the hydraulic pump is driven only by an engine.
Figure 4:
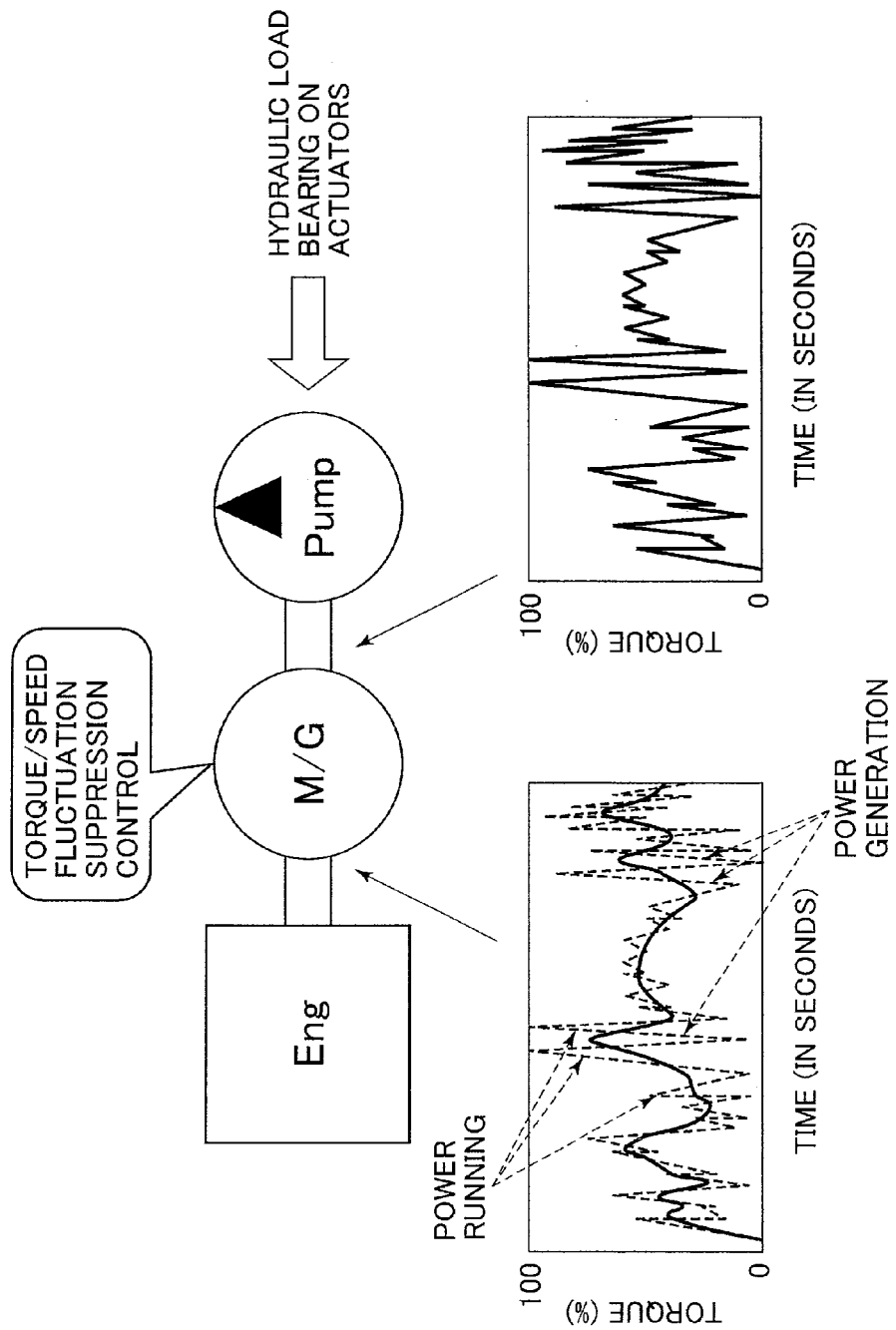
FIG. 4 is an explanatory view showing the idea of suppressing large fluctuations in pump absorption torque using an assist electric motor.

FIG. 3 is an illustration showing typical fluctuations in the load torque bearing on the hydraulic pump 6 of an ordinary actuator drive control system which is devoid of the assist electric motor 10 and of which the hydraulic pump 6 is driven only by the engine 7. FIG. 4 is an explanatory view showing the idea of suppressing large fluctuations in pump absorption torque using the assist electric motor 10. In this ordinary actuator drive control system allowing the hydraulic pump 6 to be driven only by the engine 7, the rotating bodies consisting of the hydraulic pump 6 and engine 7 share a rotary shaft. The fluctuations in the load torque bearing on the hydraulic pump 6 shown in FIG. 3 are equivalent to the fluctuations in the load torque of the engine 7.

Unlike automobiles or the like, construction working machines such as hydraulic shovels are subject to very large fluctuations in the load torque (pump absorption torque) of the hydraulic pump, the fluctuations stemming from those in the load bearing on actuators as shown in FIG. 3. As a result, the fluctuations in the load on the engine are also extremely large. For example, the load torque of the engine 7 can vary from about 0 to 100 percent instantaneously as illustrated in FIG. 3. According to its basic characteristics, the engine is subject to large fluctuations in engine revolution speed if there occur significant fluctuations in load torque while the engine is running under the conditions of a constant revolution speed/constant torque. This can entail a tendency toward growing emissions of particulate matter (PM) and nitrogen oxides (NOx) which are air pollutants contained in the exhaust gas.

Thus with this embodiment, while the revolution speed of the engine 7 is being controlled to stay at a predetermined revolution speed, the assist electric motor 10 connected interposingly between the hydraulic pump 6 and the engine 7 is controlled to ease the large load torque fluctuations bearing on the hydraulic pump 6 (fluctuations in pump absorption torque) as shown in the bottom right part of FIG. 4, whereby the emissions of PM and NOx stemming from the fluctuations in revolution speed/torque are suppressed. That is, while the engine 7 is being controlled to maintain its predetermined engine revolution speed, the load torque of the hydraulic pump 6 is separated into a trend component (low-frequency component) and the remaining high-frequency component (transient component) thereof. Power running/generation control commands are then issued to the assist electric motor 10 in such a manner that the high-frequency component is removed. This causes the output torque of the engine 7 to remain within a predetermined range (i.e., target output torque for the engine 7 corresponding to the trend component of the load torque (pump absorption torque) of the hydraulic pump 6), whereby the emissions of particulate matter (PM) and nitrogen oxides (NOx) as air pollutants in the exhaust gas can be minimized.

Figure 5:
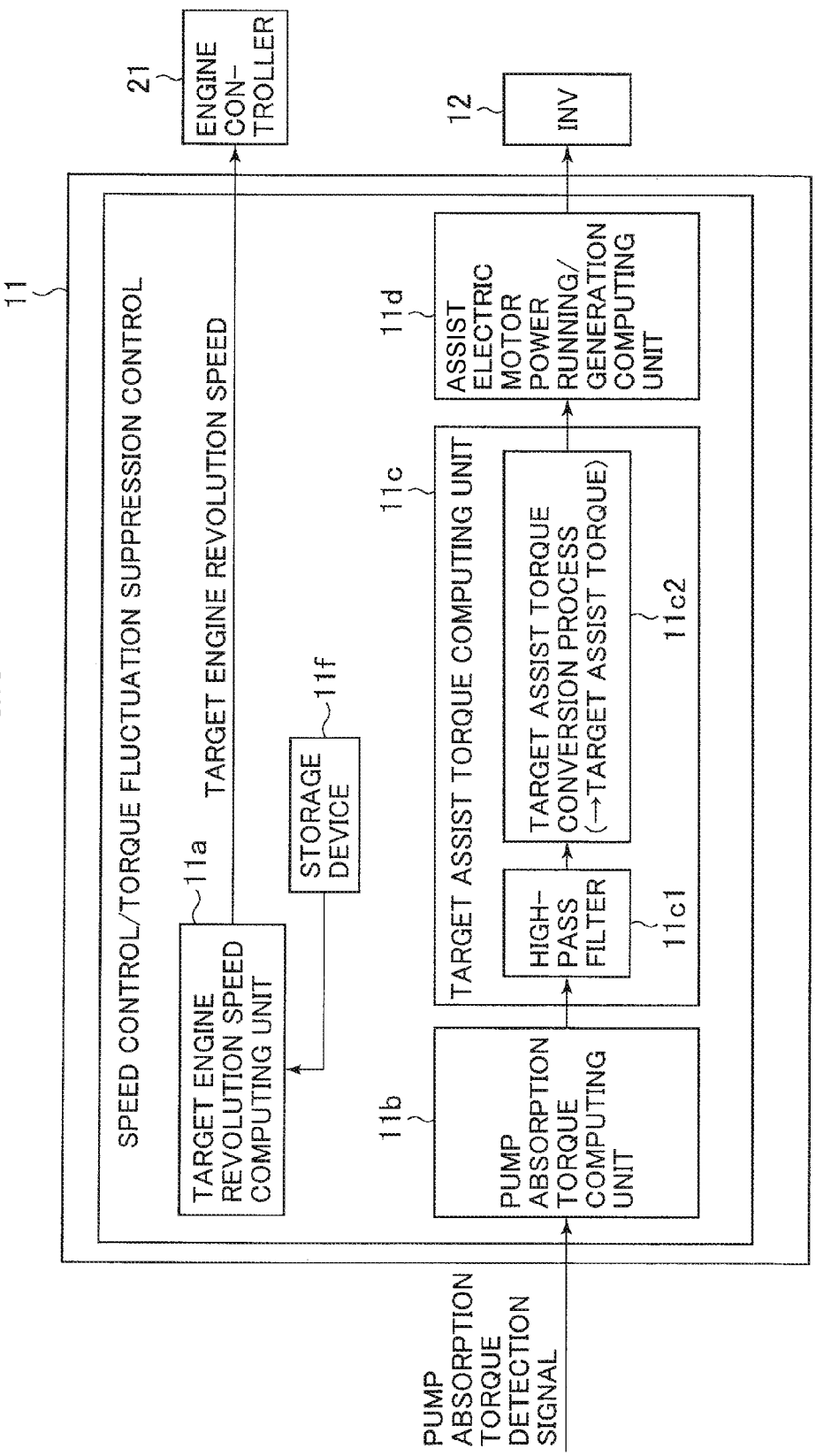
FIG. 5 is a function block diagram showing detailed processes of speed control and torque fluctuation suppression control performed by a vehicle body controller.

FIG. 5 is a function block diagram showing detailed processes of speed control and torque fluctuation suppression control performed by the vehicle body controller 11.

The vehicle body controller 11 includes the functions composed of a target engine revolution speed computing unit 11*a*, a pump absorption torque computing unit 11*b*, a target assist torque computing unit 11*c*, and an assist electric motor power running/generation computing unit 11*d*; and a storage device 11*f*.

The storage device 11*f* stores an engine revolution speed Nea (see FIG. 10) as a specific engine revolution speed suitable for reducing the emissions of particulate matter (PM) and nitrogen oxides (NOx) contained in the exhaust gas from the engine 7.

The target engine revolution speed computing unit 11*a* reads the engine revolution speed Nea stored in the storage device 11*f*, sets the retrieved speed as the target revolution speed for the engine 7, and outputs the set value to the engine controller 21. The engine controller 21 computes the deviation between the target revolution speed and the actual revolution speed of the engine 7 detected by the revolution sensor 23, computes a target fuel injection amount corresponding to the computed deviation, and outputs a corresponding control signal to the electronic governor 7*a*, whereby the engine 7 is controlled to maintain its target revolution speed.

Although not shown, the vehicle body controller 11 may further include another target revolution speed computing unit that receives a command signal from the engine control dial 20 and computes the target revolution speed based on the command signal. In this case, a mode switch may be provided to select either the target revolution speed computed by the target engine revolution speed computing unit 11*a* based on the command signal from the engine control dial 20, or the target revolution speed computed by the other target revolution speed computing unit.

The pump absorption torque computing unit 11*b* receives detection signals (electric signals) from the torque sensor 19 and thereby computes the load torque of the hydraulic pump 6 (pump absorption torque).

Figure 6:
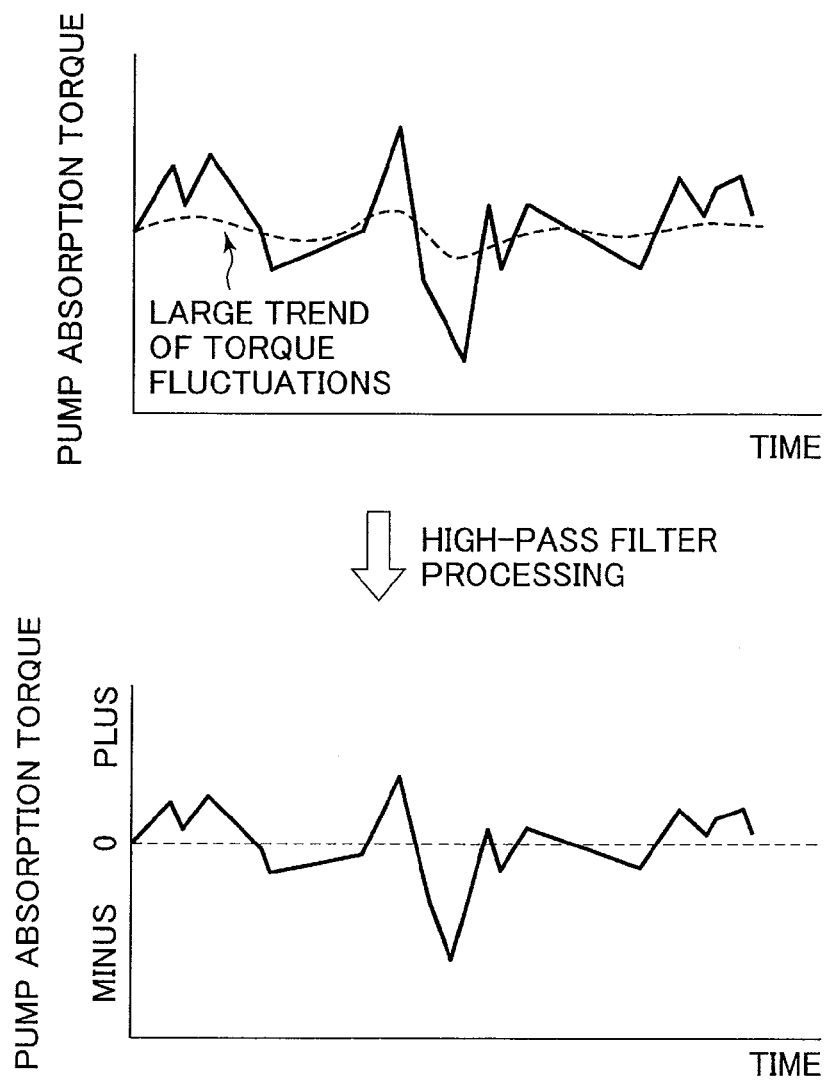
FIG. 6 is an illustration showing the concept of processing by a high-pass filter processing unit.
Figure 7:
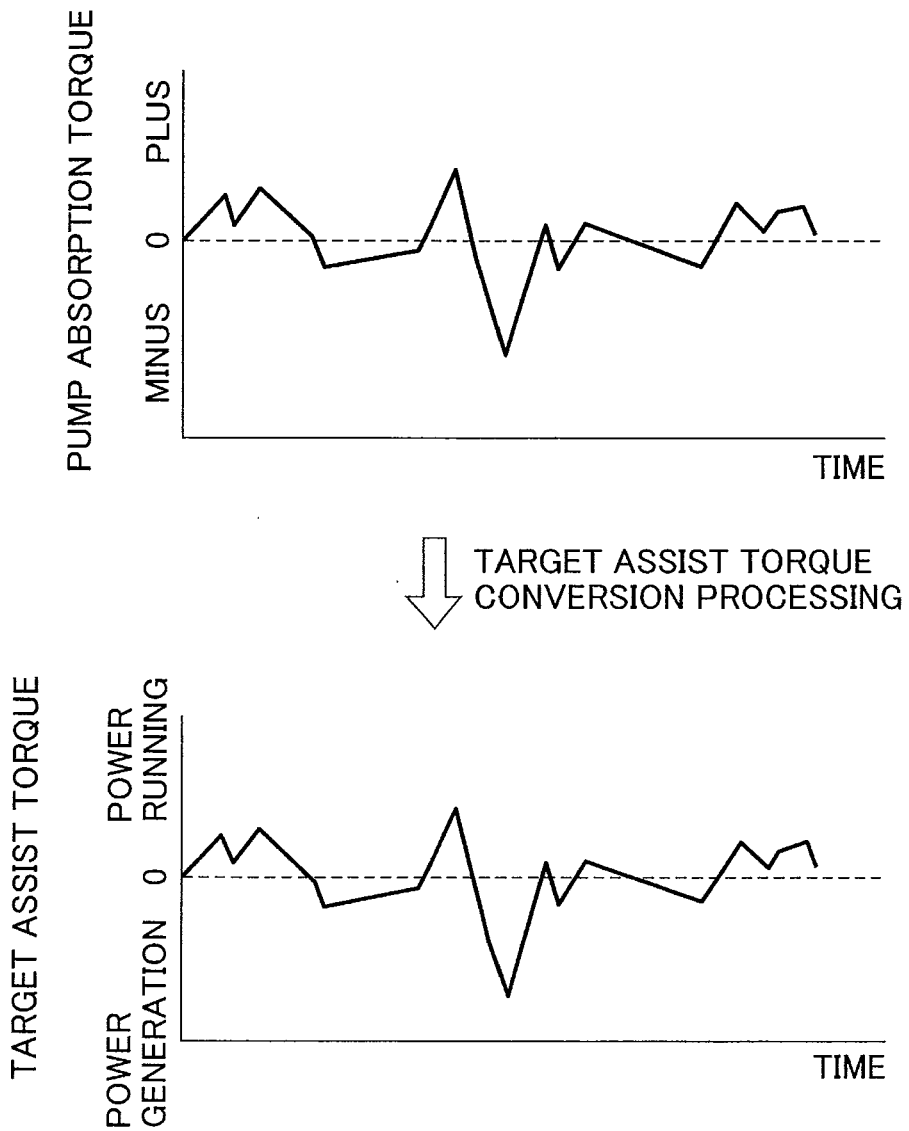
FIG. 7 is an illustration showing the concept of processing by a target assist torque conversion processing unit.

The target assist torque computing unit 11*c* includes a high-pass filter processing unit 11*c*1 and a target assist torque conversion processing unit 11*c*2. FIG. 6 shows the concept of processing by the high-pass filter processing unit 11*c*1, and FIG. 7 shows the concept of processing by the target assist torque conversion processing unit 11*c*2. In the target assist torque computing unit 11*c*, the high-pass filter processing unit 11*c*1 first performs a high-pass filtering process based on a predetermined cutoff frequency regarding the load torque of the hydraulic pump 6 computed by the pump absorption torque computing unit 11*b* as shown in FIG. 6. The process removes the low-frequency component lower than the cutoff frequency from the fluctuating load torque of the hydraulic pump 6, thereby extracting only the high-frequency component.

Here, the low-frequency component which is lower than the cutoff frequency for the load torque of the hydraulic pump 6 and which is removed from that load torque by the high-pass filter processing unit 11*c*1 represents a moving average over time of the load torque of the hydraulic pump 6. In this description, this component is called the trend component of the load torque. Then the target assist torque conversion processing unit 11*c*2 computes target assist torque for the assist electric motor 10 based on the high-frequency component of the load torque of the hydraulic pump 6 as shown in FIG. 7.

Figure 8:
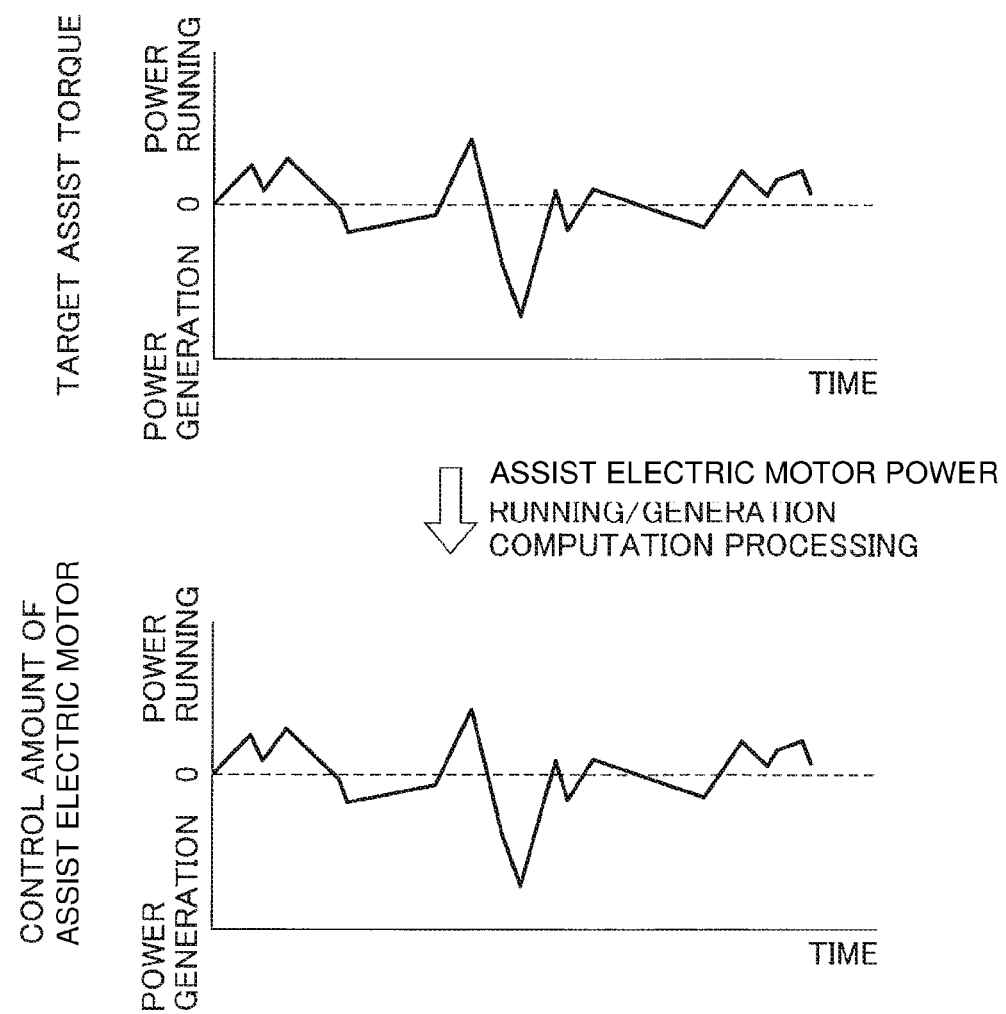
FIG. 8 is an illustration showing the concept of processing by an assist electric motor power running/generation computing unit.

FIG. 8 is an illustration showing the concept of processing by the assist electric motor power running/generation computing unit 11*d*. As shown in FIG. 8, the assist electric motor power running/generation computing unit 11*d* computes the power running/generation power to be ordered to the assist electric motor 10 in accordance with the power running/generation values of the target assist torque for the assist electric motor 10 obtained by the target assist torque conversion processing unit 11*c*2 of the target assist torque computing unit 11*c*, and sends control signals accordingly to the inverter 12 to perform power running/generation control of the assist electric motor 10.

Figure 9:
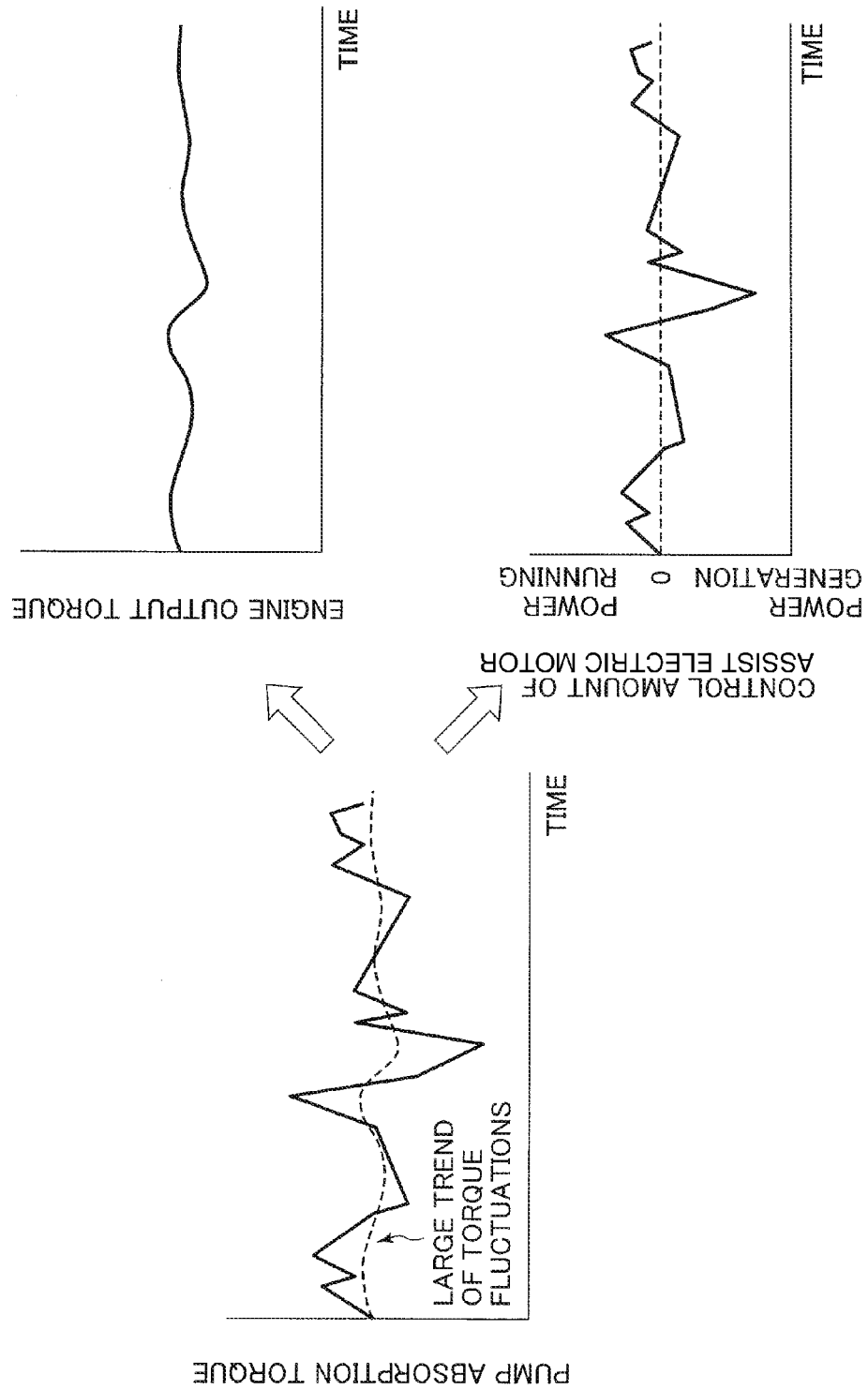
FIG. 9 is an illustration showing the whole concept of processing by a target assist torque computing unit and by the assist electric motor power running/generation computing unit.

FIG. 9 is an illustration showing the whole concept of processing by the target assist torque computing unit 11*c* and by the assist electric motor power running/generation computing unit 11*d*.

When the load torque of the hydraulic pump 6 (pump absorption torque) fluctuates as indicated by a solid line on the left-hand side of FIG. 9, the assist electric motor 10 is subjected to power running or generation as shown in the bottom right part of FIG. 9. That is, when the load torque of the hydraulic pump 6 is higher than the trend component of load torque providing the reference as indicated by a broken line on the left-hand side of FIG. 9, the assist electric motor 10 is subjected to power running with a counter (reverse torque) applied against the increase in the load torque of the hydraulic pump 6, thereby preventing the large fluctuations in the load torque of the hydraulic pump 6 from getting transmitted unmitigated to the engine 7. Conversely, when the load torque of the hydraulic pump 6 is lower than the trend component of load torque providing the reference as indicated by the broken line on the left-hand side of FIG. 9, the assist electric motor 10 is subjected to power generation. This applies appropriate torque to the assist electric motor 10 against a sudden drop in the load torque of the hydraulic pump 6, whereby the abrupt fluctuations in the load torque of the hydraulic pump 6 are prevented from getting transmitted unmitigated to the engine 7 as is the case when the load torque of the hydraulic pump 6 is higher. Where the fluctuations in the load torque transmitted to the engine 7 are suppressed in this manner, the output torque of the engine 7 is controlled to be substantially equal to the trend component of load torque serving as the reference indicated by the broken line on the left-hand side of FIG. 9, as plotted by a broken line on the right-hand side of FIG. 9. That is, it may be said that the target assist torque computing unit 11*c* and assist electric motor power running/generation computing unit 11*d* control the assist electric motor 10 in such a manner as to obtain the target output torque for the engine 7 represented by the trend component of the load torque of the hydraulic pump 6 indicated by the broken line on the right-hand side of FIG. 9.

Figure 10:
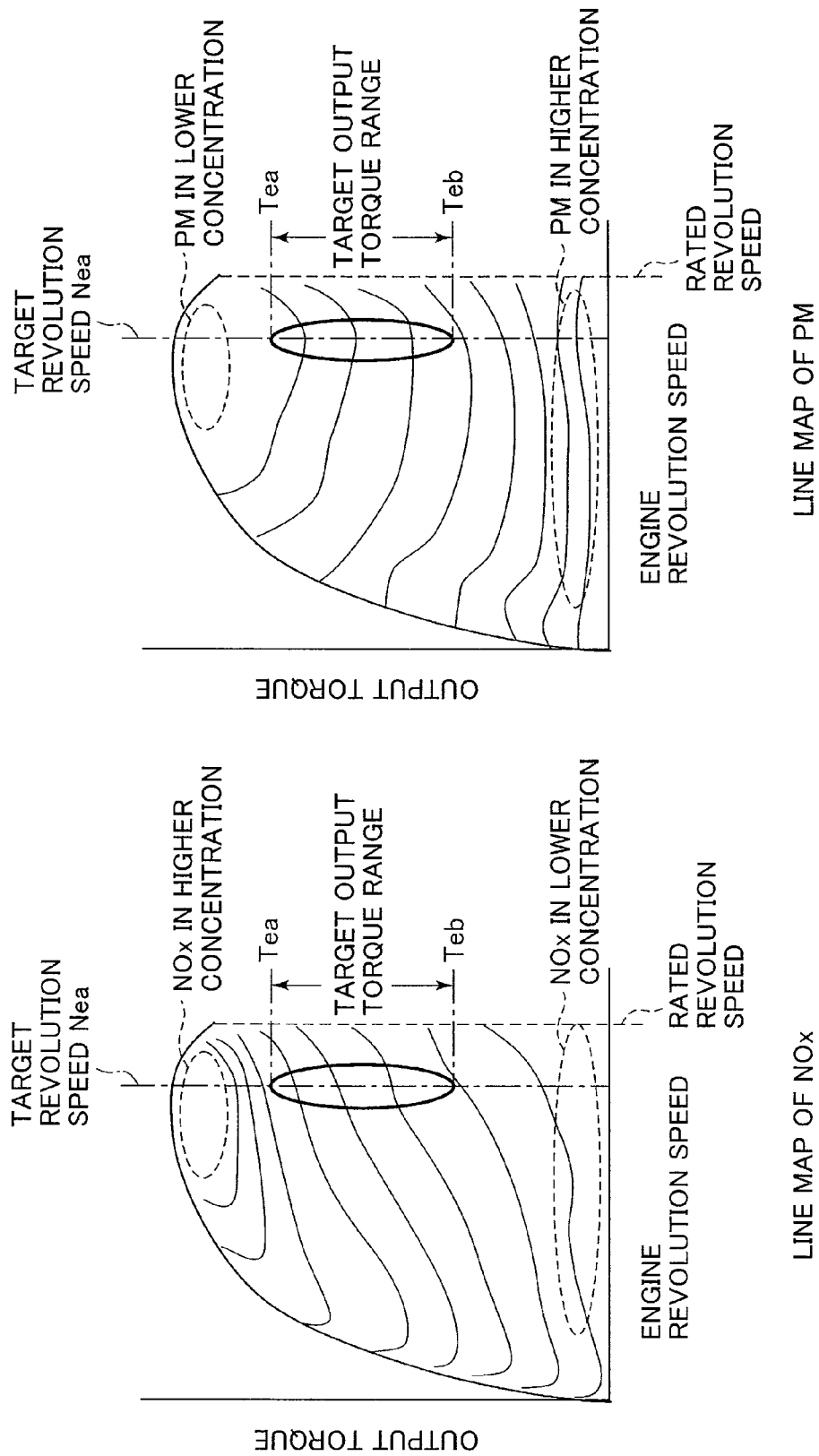
FIG. 10 is a diagrammatic view showing line maps of the emissions of particulate matter (PM) and those of nitrogen oxides (NOx) contained in the exhaust gas from an engine, each of the maps representing the correlations between the revolution speed and output torque of the engine.

FIG. 10 is a diagrammatic view showing line maps of the emissions of particulate matter (PM) and those of nitrogen oxides (NOx) contained in the exhaust gas from the engine 7, each of the maps representing the correlations between the revolution speed and output torque of the engine 7. Explained below in reference to FIG. 10 are the engine revolution speed Nea and an output torque range Tea-Teb to be stored in the storage device 11*f*.

In a steady state, the emissions of particulate matter (PM) and those of nitrogen oxides (NOx) contained in the exhaust gas fall into a high-emission region and a low-emission region in the correlations between the engine revolution speed and the engine output torque as shown in FIG. 10. Although the profiles and absolute values defining these regions vary depending on the characteristics unique to a given engine, the emissions of PM and those of NOx are generally in a trade-off relation to each other. When revolution speed and torque are both high entailing high exhaust temperatures, the emissions of NOx are high and those of PM are low. When revolution speed and torque are both low entailing low exhaust temperatures, the emissions NOx are low and those of PM are high. However, from the point of view of having the emissions of PM and those of NOx added up, there exists the region in which the total emissions are the lowest. For example, ellipses shown in FIG. 10 represent such regions defined by the engine revolution speed Nea and output torque range Tea-Teb.

With this embodiment, the engine revolution speed Nea is stored in the storage device 11f. Then, the target engine revolution speed computing unit 11a performs control in such a manner that the engine revolution speed Nea is set as the target revolution speed for the engine 7 and that the engine revolution speed is maintained at the revolution speed Nea defining the region in which the total emissions of PM and NOx are the lowest. With such engine revolution speed control in effect, the target assist torque computing unit 11c performs power running/generation control of the assist electric motor 10 so as to ease the large load fluctuations bearing on the hydraulic pump 6 for torque fluctuation suppression control. This allows the output torque of the engine 7 to be maintained at values near the output torque range Tea-Teb defining the region in which the total emissions of PM and NOx are the lowest.

According to this embodiment structured as explained above, the engine revolution speed is controlled to be maintained at the revolution speed Nea defining the region in which the total emissions of PM and NOx are the lowest. This makes it possible to reduce the emissions of PM and NOx as air pollutants contained in the exhaust gas. Moreover, with such engine revolution speed control in effect, if the load torque of the hydraulic pump 6 (pump absorption torque) becomes higher or lower than the output torque of the engine 7, the abrupt fluctuations in the absorption torque of the hydraulic pump 6 are prevented from getting transmitted unmitigated to the engine 7. The output torque of the engine 7 is controlled to be maintained within a specific range, i.e., at values near the output torque range Tea-Teb defining the region in which the total emissions of PM and NOx are the lowest. As a result, it is possible to minimize the emissions of PM and NOx contained in the exhaust gas.

Also, conventionally, the exhaust gas after-treatment device such as the DPF (diesel particular filter) and urea SCR system is attached to an exhaust pipe between the engine 7 and a muffler, not shown, as indicated by dashed lines in FIG. 2. The attachment provides the process of capturing and purifying particulate matter (PM) and nitrogen oxides (NOx).

With this embodiment, as explained above, the assist electric motor 10 is subjected to power running control or generation control depending on whether the high-frequency component of the load torque of the hydraulic pump 6 is positive or negative, the high-frequency component being the differential torque between the load torque of the hydraulic pump 6 and the trend component of this load torque (target output torque for the engine), whereby the emissions of particulate matter (PM) and nitrogen oxides (NOx) are suppressed. This in turn makes it possible to downsize the displacement of the DPF and the tank of the urea SCR system, or to eliminate the exhaust gas after-treatment device depending on the situation.

Furthermore, when the assist electric motor 10 is subjected to power running control or generation control, the load fluctuations bearing on the engine 7 are reduced. This provides the additional benefit of prolonging the service life of the engine 7 as well as improving the reliability of the engine 7.

Second Embodiment

The second embodiment of the present invention is explained below in reference to FIGS. 11 through 14. This embodiment involves performing the same torque fluctuation suppression control as that of the first embodiment, and setting the revolution speed and engine output torque range of the engine 7 to regions suitable for reducing the emissions of particulate matter (PM) and nitrogen oxides (NOx) as air pollutants contained in the exhaust gas from the engine 7, whereby the emissions of PM and NOx are suppressed more effectively.

Figure 11:
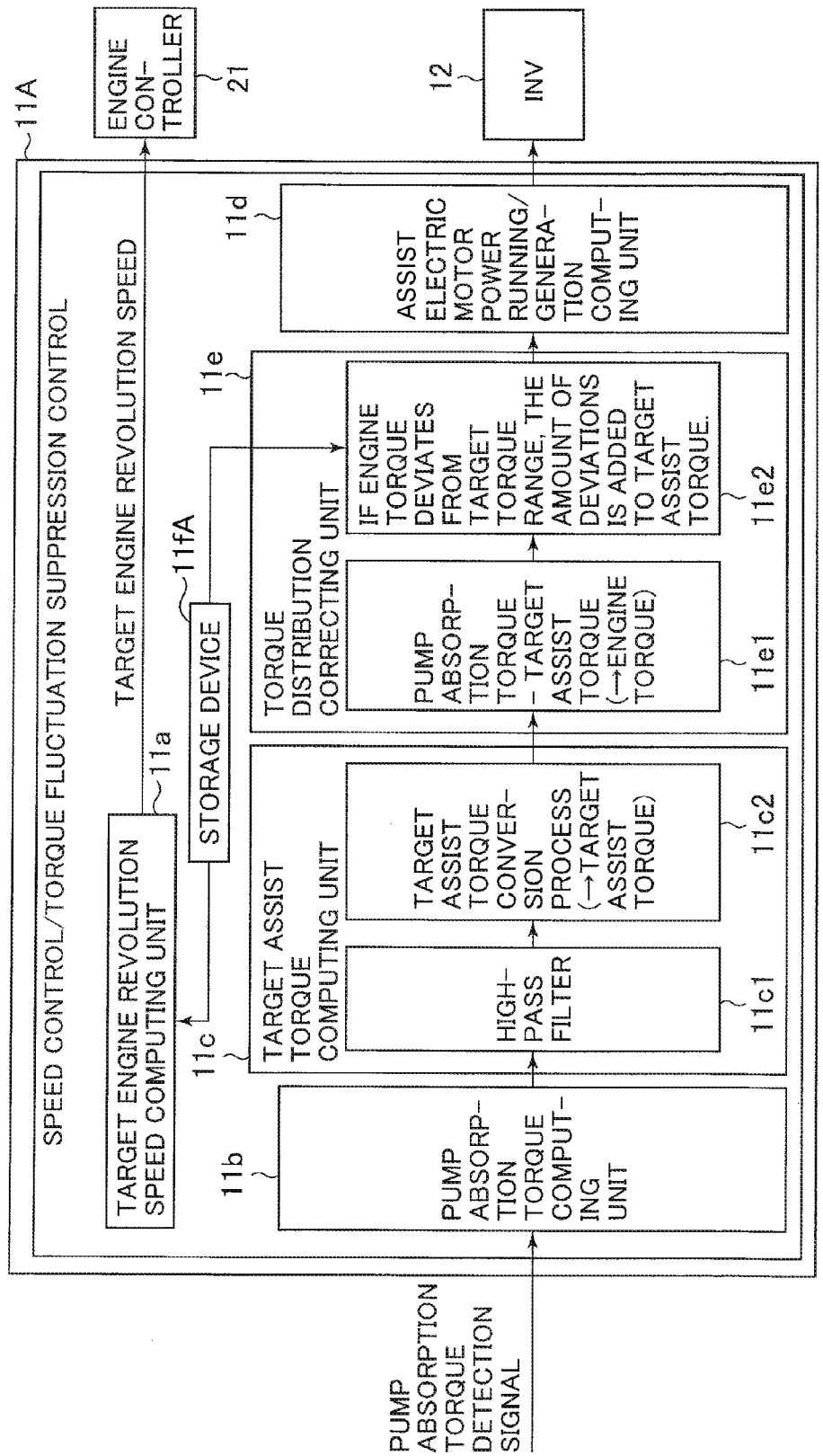
FIG. 11 is a function block diagram showing detailed processes of speed control and torque fluctuation suppression control performed by a vehicle body controller as a second embodiment of the present invention.

FIG. 11 is a function block diagram showing detailed processes of speed control and torque fluctuation suppression control performed by a vehicle body controller 11A as the second embodiment of this invention.

The vehicle body controller 11A of this embodiment includes the functions composed of a target engine revolution speed computing unit 11a, a pump absorption torque computing unit 11b, a target assist torque computing unit 11c, a torque distribution correcting unit 11e, and an assist electric motor power running/generation computing unit 11d; and a storage device 11fA.

The detailed processes performed by the target engine revolution speed computing unit 11a, pump absorption torque computing unit 11b, and target assist torque computing unit 11c are the same as in the first embodiment and thus will not be discussed further.

The storage device 11fA stores the engine revolution speed Nea and output torque range Tea-Teb shown in FIG. 10, the speed and range being a specific engine speed and a specific engine output torque range suitable for reducing the emissions of particulate matter (PM) and nitrogen oxides (NOx) contained in the exhaust gas from the engine 7.

Figure 12:
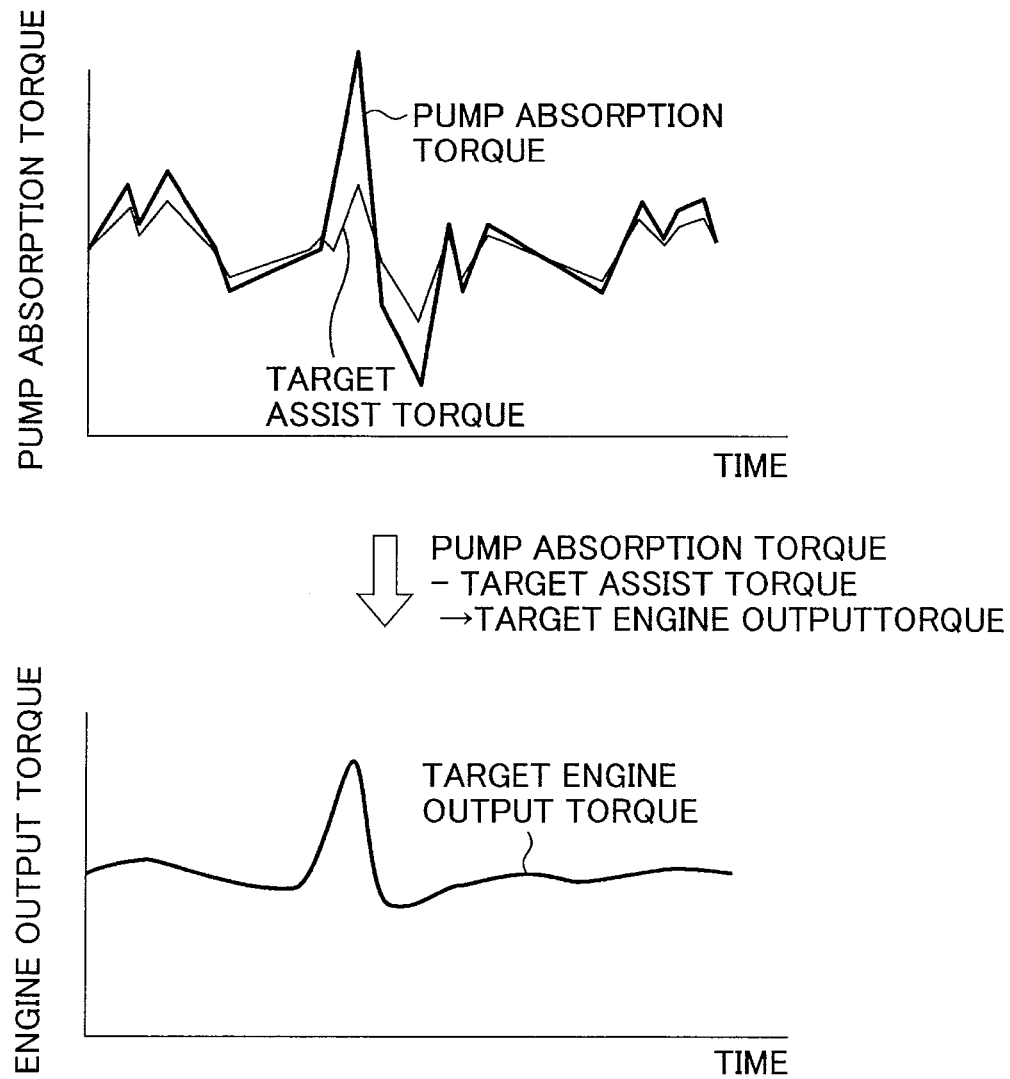
FIG. 12 is an illustration showing the concept of processing by an engine output torque computing unit.
Figure 13:
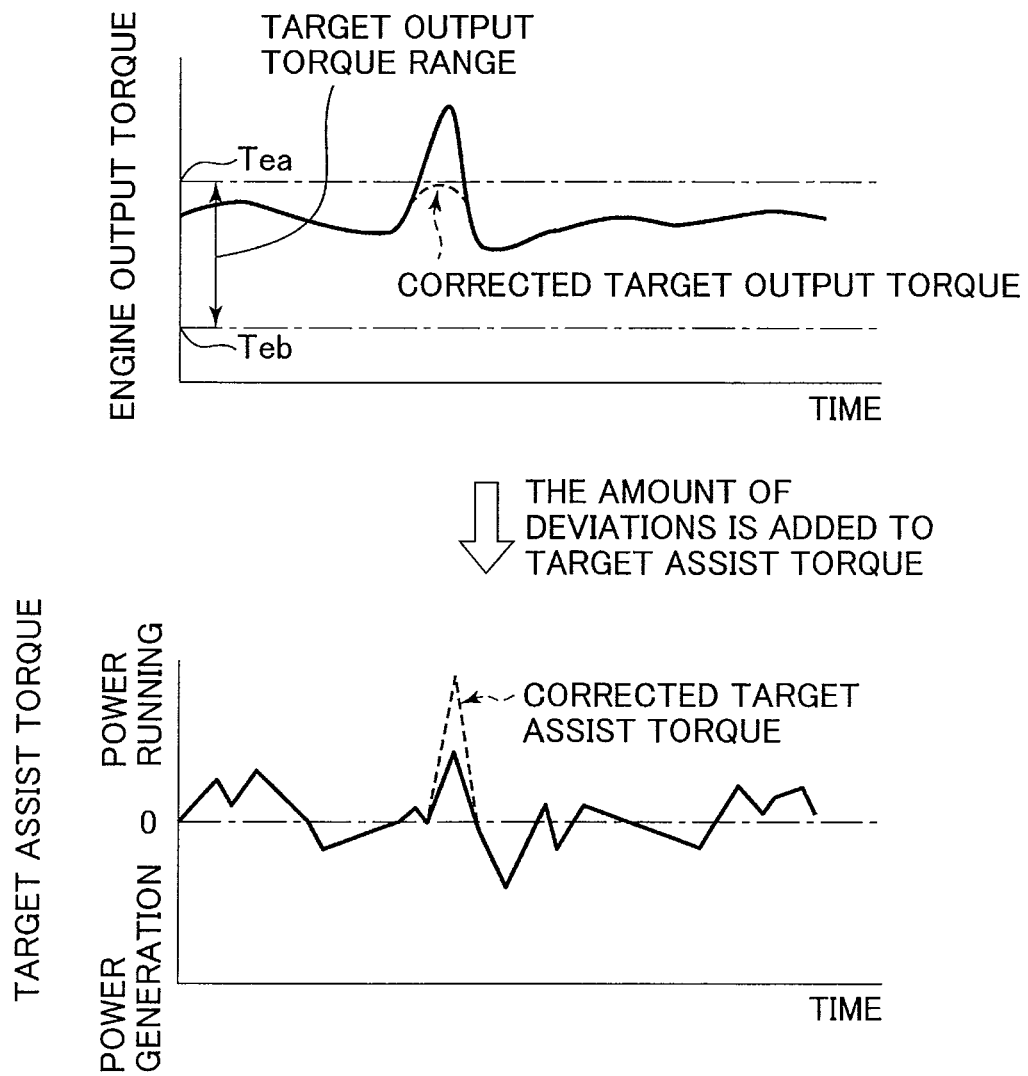
FIG. 13 is an illustration showing the concept of processing by a target assist torque correcting unit.

The torque distribution correcting unit 11e includes an engine output torque computing unit 11e1 and a target assist torque correcting unit 11e2. FIG. 12 shows the concept of processing by the engine output torque computing unit 11e1, and FIG. 13 shows the concept of processing by the target assist torque correcting unit 11e2. In the torque distribution correcting unit 11e, the engine output torque computing unit 11e1 first computes engine output torque by subtracting the target assist torque obtained by the target assist torque computing unit 11c from the load torque of the hydraulic pump 6 (pump absorption torque) acquired by the pump absorption torque computing unit 11b as shown in FIG. 12. The computed engine output torque is made up of values corresponding to the trend component of load torque serving as the reference indicated by broken lines in FIG. 9 and others. Then the target assist torque correcting unit 11e2 reads the output torque range Tea-Teb (shown in FIG. 10) stored in the storage device 11fA. If the target output torque for the engine takes values deviating from the output torque range Tea-Teb as shown in FIG. 13, the target assist torque correcting unit 11e2 corrects the target output torque for the engine in such a manner that the target output torque falls within the output torque range Tea-Teb. The amount of the deviations from the target output torque for the engine before the correction is added to the target assist torque obtained by the target assist torque computing unit 11c.

Figure 14:
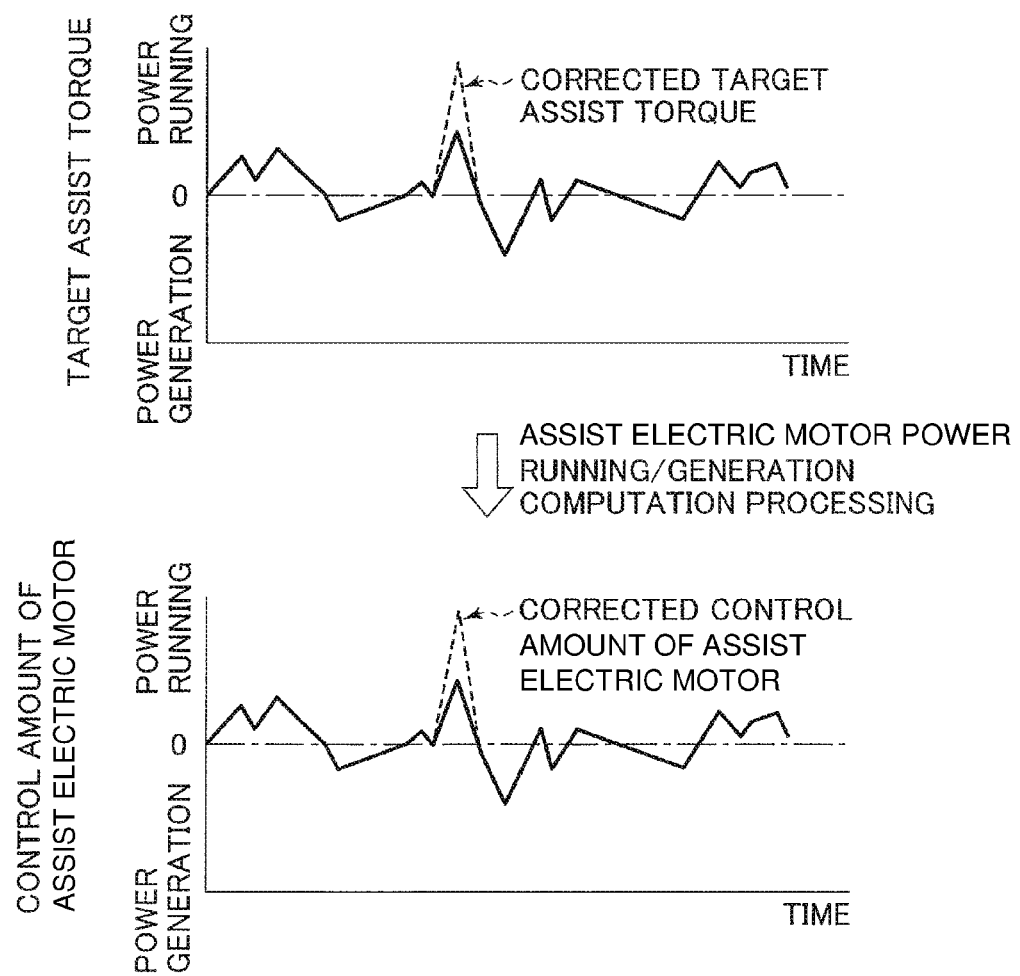
FIG. 14 is an illustration showing the concept of processing by another assist electric motor power running/generation computing unit.

FIG. 14 is an illustration showing the concept of processing by the assist electric motor power running/generation computing unit 11d. As with the first embodiment, as shown in FIG. 14, the assist electric motor power running/generation computing unit 11d computes the power running/generation power to be ordered to the assist electric motor 10 in accordance with the values of power running/generation of the target assist torque obtained by the torque distribution correcting unit 11e, and sends control signals accordingly to the inverter 12 to perform power running/generation control of the assist electric motor 10. The control amount of assist electric motor is also corrected in keeping with the target assist torque corrected by the torque distribution correcting unit 11e.

With this embodiment, the storage device 11fA stores the engine revolution speed Nea and output torque range Tea-Teb shown in FIG. 10. Then, the target engine revolution speed computing unit 11a sets the engine revolution speed Nea as the target revolution speed for the engine 7, and performs control to keep the engine revolution speed at the revolution speed Nea defining the region in which the total emissions of PM and NOx are the lowest. Also, with such engine revolution speed control in effect, the target assist torque computing unit 11c and assist electric motor power running/generation computing unit 11d perform power running/generation control of the assist electric motor 10 in such a manner as to ease the large load fluctuations bearing on the hydraulic pump 6 for torque fluctuation suppression control, as with the first embodiment. In addition, with the second embodiment, the torque distribution correcting unit 11e corrects target engine output torque when the output torque of the engine 7 under torque fluctuation suppression control deviates from the output torque range Tea-Teb. The output torque of the engine 7 is controlled to stay within the output torque range Tea-Teb defining the region in which the total emissions of PM and NOx are the lowest.

With this embodiment, as explained above, a specific engine revolution speed Nea and a specific engine output torque range Tea-Teb are predetermined which are suitable for reducing the emissions of particulate matter (PM) and nitrogen oxides (NOx) as air pollutants contained in the exhaust gas from the engine 7. While the engine revolution speed is being controlled to remain at the specific engine revolution speed Nea as the target engine revolution speed, the output torque of the engine 7 is controlled within the specific engine output torque range Tea-Teb defining the upper and the lower limits of the target output torque for the engine 7. In this manner, the revolution speed and output torque of the engine 7 are controlled to stay within the region in which the total emissions of PM and NOx shown in FIG. 10 are the lowest, whereby the emissions of PM and NOx are further suppressed.

<Variations of the Second Embodiment>

With the above-described second embodiment, the target revolution speed and output torque range for the engine 7 are set to the region in which the total emissions of PM and NOx are the lowest. Alternatively, however, the target revolution speed and output torque range for the engine 7 may be set based on factors other than the total emissions of PM and NOx or on other additional factors. These factors include, for example, a combination of the emissions of PM with the fuel consumption of the engine 7, a combination of the emissions of NOx with the fuel consumption, a combination of the total emissions of PM and NOx with the fuel consumption, only the emissions of PM, and only the emissions of NOx.

Explained first is the combination of the emissions of PM with the fuel consumption for use in setting the target revolution speed and output torque range for the engine 7.

FIG. 15 is a diagrammatic views showing line maps of the emissions of particulate matter (PM) contained in the exhaust gas from the engine 7 (right-hand side map) and the fuel consumption of the engine 7 (left-hand side map), each of the maps representing the correlations between the revolution speed and output torque of the engine 7. The right-hand side map of the emissions of PM in FIG. 15 is the same as in FIG. 10 (right-hand side map). As shown on the left-hand side in FIG. 15, the fuel consumption of the engine 7 falls into a high fuel consumption region and a low fuel consumption region in the correlations between the engine revolution speed and the engine output torque. Comparing the emissions of PM with the fuel consumption for the relations therebetween reveals the presence of the regions in which the emissions of PM and the fuel consumption, in combination, are the lowest. For example, ellipses shown in FIG. 15 represent such regions defined by an engine revolution speed Nec and an output torque range Tee-Tef.

Thus the storage device 11fA of the vehicle body controller 11A shown in FIG. 11 is caused to store the engine revolution speed Nec and the output torque range Tee-Tef. The target engine revolution speed computing unit 11a sets the engine revolution speed Nec as the target revolution speed for the engine 7. When the target output torque for the engine 7 deviates from the output torque range Tee-Tef, the target assist torque correcting unit 11e2 of the torque distribution correcting unit 11e corrects the target output torque for the engine in such a manner that the target output torque stays within the output torque range Tee-Tef. The amount of the deviations from the target output torque for the engine before the correction is added to the target assist torque obtained by the target assist torque computing unit 11c. This control allows the engine revolution speed to be maintained at the revolution speed Nec defining the region in which the emissions of PM and the fuel consumption are the lowest, and causes the engine output torque to stay within the output torque range Tee-Tef defining the region in which the emissions of PM and the fuel consumption are the lowest.

That makes it possible not only to suppress the emissions of PM and NOx with the assist electric motor 10 under power running/generation control but also to further reduce the emissions of PM and lower the fuel consumption by appropriately setting the target revolution speed and output torque range for the engine 7.

Explained below is the combination of the emissions of NOx with the fuel consumption for use in setting the target revolution speed and output torque range for the engine 7.

Figure 16:
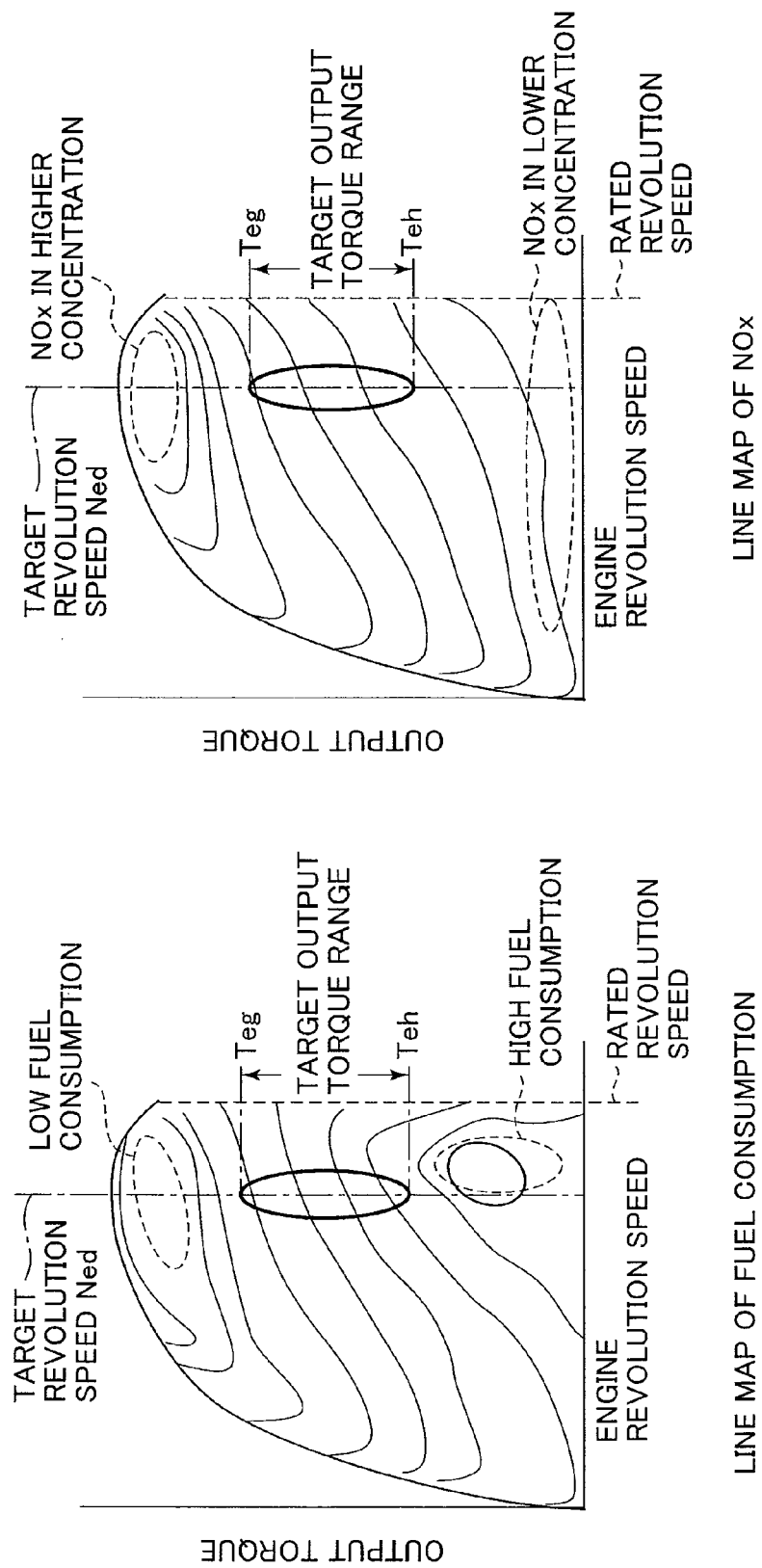
FIG. 16 is a diagrammatic view showing line maps of the emissions of nitrogen oxides (NOx) contained in the exhaust gas from the engine and the fuel consumption of the engine, each of the maps representing the correlations between the revolution speed and output torque of the engine.

FIG. 16 is a diagrammatic view showing line maps of the emissions of nitrogen oxides (NOx) contained in the exhaust gas from the engine 7 (right-hand side map) and the fuel consumption of the engine (left-hand side map), each of the maps representing the correlations between the revolution speed and output torque of the engine 7. The map of the emissions of NOx and the map of the fuel consumption are the same, respectively, as in FIG. 10 (left-hand side map) and in FIG. 15 (left-hand side map). Comparing the emissions of NOx with the fuel consumption for the relations therebetween reveals the presence of the regions in which the emissions of NOx and the fuel consumption, in combination, are the lowest. For example, ellipses shown in FIG. 16, each defined by an engine revolution speed Ned and an output torque range Teg-Teh, represent such regions.

Thus the storage device 11fA of the vehicle body controller 11A shown in FIG. 11 is caused to store the engine revolution speed Ned and the output torque range Teg-Teh. The target engine revolution speed computing unit 11a sets the engine revolution speed Ned as the target revolution speed for the engine 7. When the target output torque for the engine 7 deviates from the output torque range Teg-Teh, the target assist torque correcting unit 11e2 of the torque distribution correcting unit 11e corrects the target output torque for the engine in such a manner that the target torque stays within the output torque range Teg-Teh. The amount of the deviations from the target output torque for the engine before the correction is added to the target assist torque obtained by the target assist torque computing unit 11c. This control causes the engine revolution speed to be maintained at the revolution speed Ned defining the region in which the emissions of NOx and the fuel consumption are the lowest, and causes the engine output torque to stay within the output torque range Teg-Teh defining the region in which the emissions of NOx and the fuel consumption are the lowest.

That makes it possible not only to suppress the emissions of PM and NOx with the assist electric motor 10 under power running/generation control but also to further reduce the emissions of NOx and lower the fuel consumption by appropriately setting the target revolution speed and output torque range for the engine 7.

Explained below is the combination of the total emissions of PM and NOx with the fuel consumption for use in setting the target revolution speed and output torque range for the engine 7.

Figure 17:
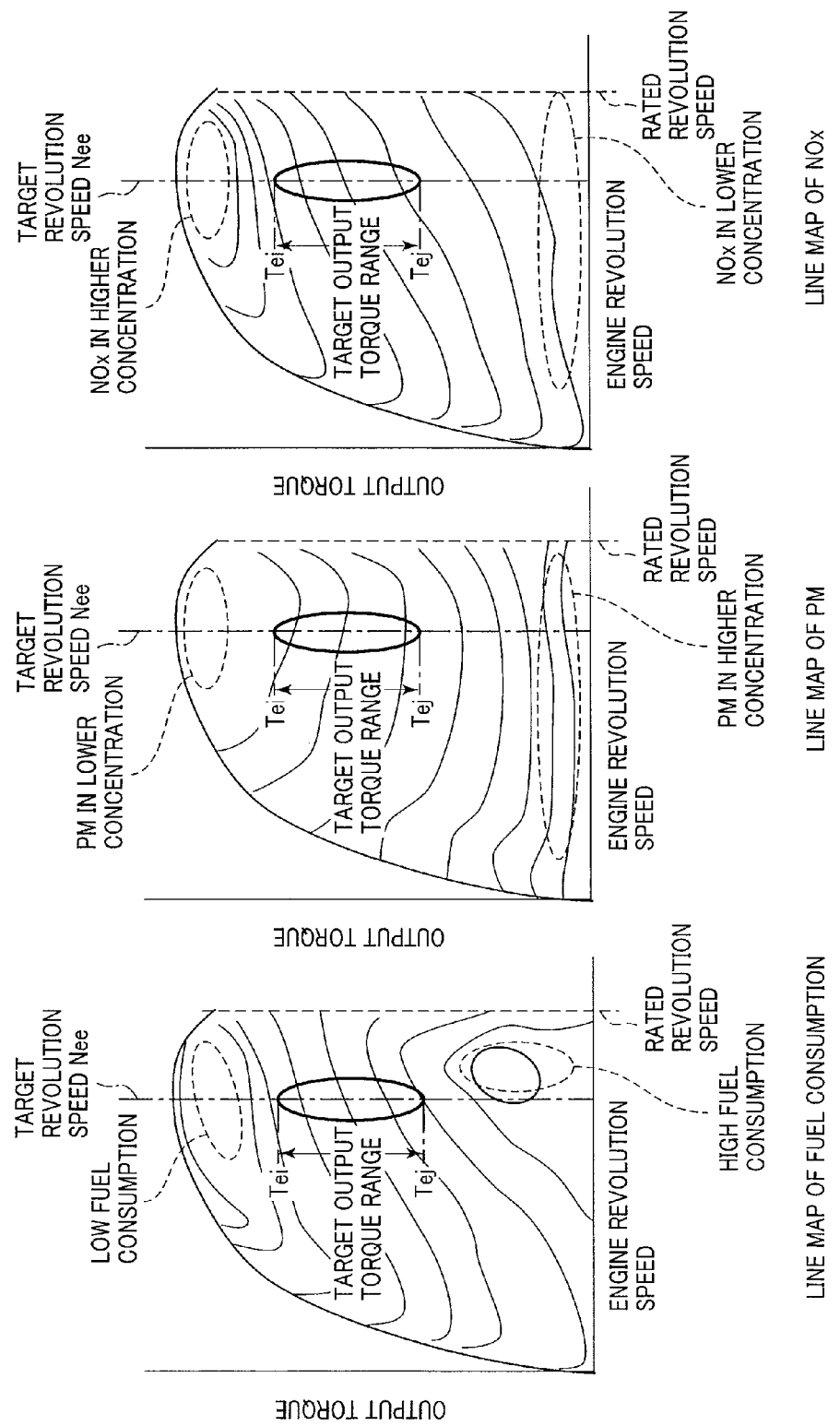
FIG. 17 is a diagrammatic view showing line maps of the emissions of particulate matter (PM) contained in the exhaust gas from the engine, the emissions of nitrogen oxides (NOx) in the exhaust gas from the engine, and the fuel consumption of the engine, each of the maps representing the correlations between the revolution speed and output torque of the engine.

FIG. 17 is a diagrammatic view showing line maps of the emissions of particulate matter (PM) contained in the exhaust gas from the engine 7 (center map), the emissions of nitrogen oxides (NOx) in the exhaust gas from the engine 7 (right-hand side map), and the fuel consumption of the engine 7 (left-hand side map), each of the maps representing the correlations between the revolution speed and output torque of the engine 7. The map of the emissions of PM and the map of the emissions of NOx are the same as in FIG. 10, and the map of the fuel consumption is the same as in FIG. 15 (left-hand side map). Comparing the emissions of PM, the emissions of NOx, and the fuel consumption for the relations therebetween reveals the presence of the regions in which the total emissions of PM and NOx and the fuel consumption, in combination, are the lowest. For example, ellipses shown in FIG. 17, each defined by an engine revolution speed Nee and an output torque range Tei-Tej, represent such regions.

Thus the storage device 11fA of the vehicle body controller 11A shown in FIG. 11 is caused to store the engine revolution speed Nee and the output torque range Tei-Tej. The target engine revolution speed computing unit 11a sets the engine revolution speed Nee as the target revolution speed for the engine 7. When the target output torque for the engine 7 deviates from the output torque range Tei-Tej, the target assist torque correcting unit 11e2 of the torque distribution correcting unit 11e corrects the target output torque for the engine in such a manner that the target output torque stays within the output torque range Tei-Tej. The amount of the deviations from the target output torque for the engine before the correction is added to the target assist torque obtained by the target assist torque computing unit 11c. This control causes the engine revolution speed to be maintained at the revolution speed Nee defining the region in which the total emissions of PM and NOx and the fuel consumption are the lowest, and causes the engine output torque to stay within the output torque range Tei-Tej defining the region in which the total emissions of PM and NOx and the fuel consumption are the lowest.

That makes it possible not only to suppress the emissions of PM and NOx with the assist electric motor 10 under power running/generation control but also to further reduce the emissions of PM and NOx and/or lower the fuel consumption by appropriately setting the target revolution speed and output torque range for the engine 7.

Although not described in detail, in the case where the emissions of PM alone or the emissions of NOx alone are used in setting the target revolution speed and output torque range for the engine 7, as in the case of the above-mentioned other factors, a specific engine revolution speed Nef or Neg and a specific engine output torque range Tek-Tel or Tem-Ten for minimizing the emissions of PM or NOx may be determined and stored into the storage device 11fA, whereby the engine revolution speed and engine output torque may be controlled.

The foregoing paragraphs have discussed variations of the second embodiment in which the storage device 11fA of the vehicle body controller 11A shown in FIG. 11 is caused to store a specific revolution speed and specific output torque different from those of the second embodiment, so that revolution speed control of the engine and assist torque control of the electric motor are performed. As a variation of the first embodiment, the storage device 11f of the vehicle body controller 11 shown in FIG. 5 may be caused to store a similar revolution speed so that control of the engine revolution speed and assist torque control of the electric motor may be performed accordingly.

Third Embodiment

The third embodiment of the present invention is explained below in reference to FIG. 18. With the second embodiment and its variations, the storage device 11fA is caused to store the engine revolution speed and output torque range for minimizing the total emissions of PM and NOx, the combination of the emissions of PM with the fuel consumption, the combination of the emissions of NOx with the fuel consumption, the combination of the total emissions of PM and NOx with the fuel consumption, only the emissions of PM, or only the emissions of NOx, whereby revolution speed control of the engine and assist torque control of the electric motor are performed. The third embodiment involves a storage device 11fB storing engine revolution speed and output torque range settings for minimizing any of the combined amounts above so that any of the settings may be selected.

Figure 18:
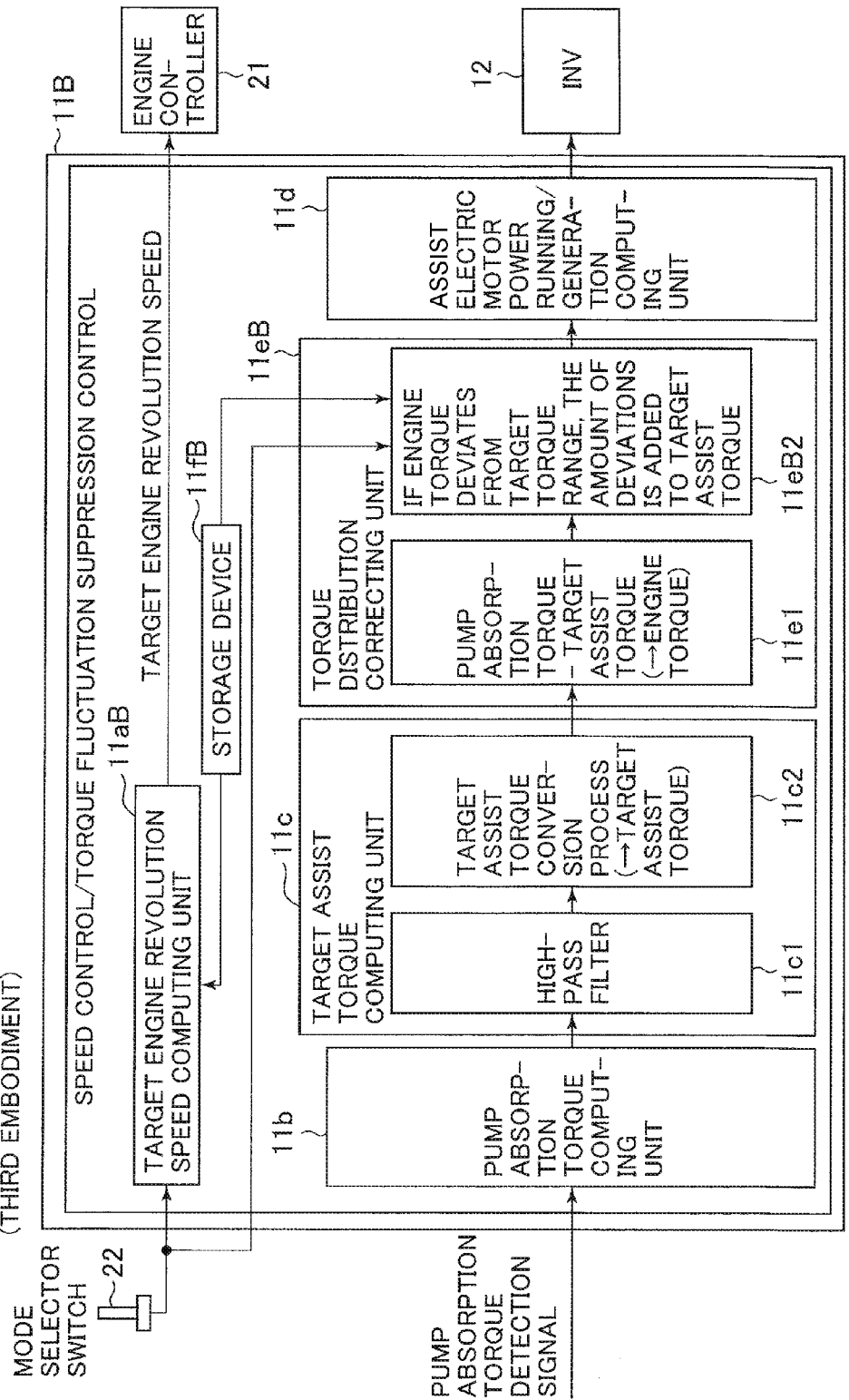
FIG. 18 is a function block diagram showing detailed processes of speed control and torque fluctuation suppression control performed by a vehicle body controller as a third embodiment of the present invention.

FIG. 18 is a function block diagram showing detailed processes of speed control and torque fluctuation suppression control performed by a vehicle body controller 11B of the third embodiment of the present invention.

The vehicle body controller 11B of this embodiment includes the functions composed of a target engine revolution speed computing unit 11aB, a pump absorption torque computing unit 11b, a target assist torque computing unit 11c, a torque distribution correcting unit 11eB, and an assist electric motor power running/generation 11d; and a storage device 11fB. Also, the hydraulic shovel of this embodiment is provided with a mode selector switch 22 for selecting one of a first mode through a sixth mode. The first mode is one in which the total emissions of PM and NOx are minimized; the second mode is one in which the emissions of PM and the fuel consumption are minimized in combination; the third mode is one in which the emissions of NOx and the fuel consumption are minimized in combination; the fourth mode is one in which the total emissions of PM and NOx and the fuel consumption are minimized in combination; the fifth mode is one in which only the emissions of PM are minimized; and the sixth mode is one in which only the emissions of NOx are minimized. The mode selector switch 22 is located to be operated by manufacturing personnel or by the manager of the working machine. A command signal from the mode selector switch 22 is input to the target engine revolution speed computing unit 11aB and to a target assist torque correcting unit 11e2B of the torque distribution correcting unit 11eB.

The storage device 11fB stores all of the above-mentioned engine revolution speeds Nea, Nec, Ned, Nee, Nef and Neg and the above-mentioned output torque ranges Tea-Teb, Tee-Tef, Teg-Teh, Tei-Tej, Tek-Tel, and Tem-Ten as the engine revolution speeds and output torque ranges for the first through the sixth modes.

The target engine revolution speed computing unit 11aB receives the command signal from the mode selector switch 22, reads the engine revolution speed Nea, Nec, Ned, Nee, Nef, or Neg corresponding to the input signal from the storage device 11fB, sets the retrieved engine revolution speed as the target revolution speed for the engine 7, and outputs the set value to the engine controller 21.

The detailed processes performed by the pump absorption torque computing unit 11b and target assist torque computing unit 11c and the detailed processes by the engine output torque computing unit 11e1 of the torque distribution correcting unit 11eB are the same as those in the first and the second embodiments and thus will not be discussed further.

The target assist torque correcting unit 11e2B of the torque distribution correcting unit 11eB receives the command signal from the mode selector switch 22, reads the range Tea-Teb, Tee-Tef, Teg-Teh, Tei-Tej, Tek-Tel, or Tem-Ten corresponding to the input signal from the storage device 11fB, and sets the retrieved torque range. As in the case shown in FIG. 13, when the target output torque for the engine deviates from the output torque range Tea-Teb, Tee-Tef, Teg-Teh, Tei-Tej, Tek-Tel, or Tem-Ten thus set, the target assist torque correcting unit 11e2B corrects the engine target output torque in such a manner that the target output torque stays within the set output torque range. The amount of the deviations from the target output torque for the engine before the correction is added to the target assist torque obtained by the target assist torque computing unit 11c.

This embodiment allows any one of the first through the sixth modes to be selected using the mode selector switch 22. This makes it possible to select optimum factors from among the total emissions of PM and NOx, the combination of the emissions of PM with the fuel consumption, the combination of the emissions of NOx with the fuel consumption, the combination of the total emissions of PM and NOx with the fuel consumption, only the emissions of PM, and only the emissions of NOx in accordance with the regulations on the work environment and working area, whereby revolution speed control of the engine is optimally performed and assist torque control of the electric motor is carried out in keeping with the regulations on the work environment and working area.

With the third embodiment, the vehicle body controller 11B including the torque distribution correcting unit 11eB as in the second embodiment is further equipped with the mode selector switch 22 for selecting the engine revolution speed and output torque range. Alternatively, the vehicle body controller 11 not provided with the torque distribution correcting unit as in the first embodiment shown in FIG. 5 may be provided with the mode selector switch 22 for selecting an engine revolution speed. In this case, optimum factors can also be selected in accordance with the regulations on the work environment and working area of the hydraulic shovel, so that revolution speed control of the engine may be optimally performed in keeping with the regulations on the work environment and working area while assist torque control of the electric motor is carried out through high-pass filter processing of the pump absorption torque.

Fourth Embodiment

The fourth embodiment of the present invention is explained below in reference to FIGS. 19 through 21. This embodiment represents another method for computing pump absorption torque.

Figure 19:
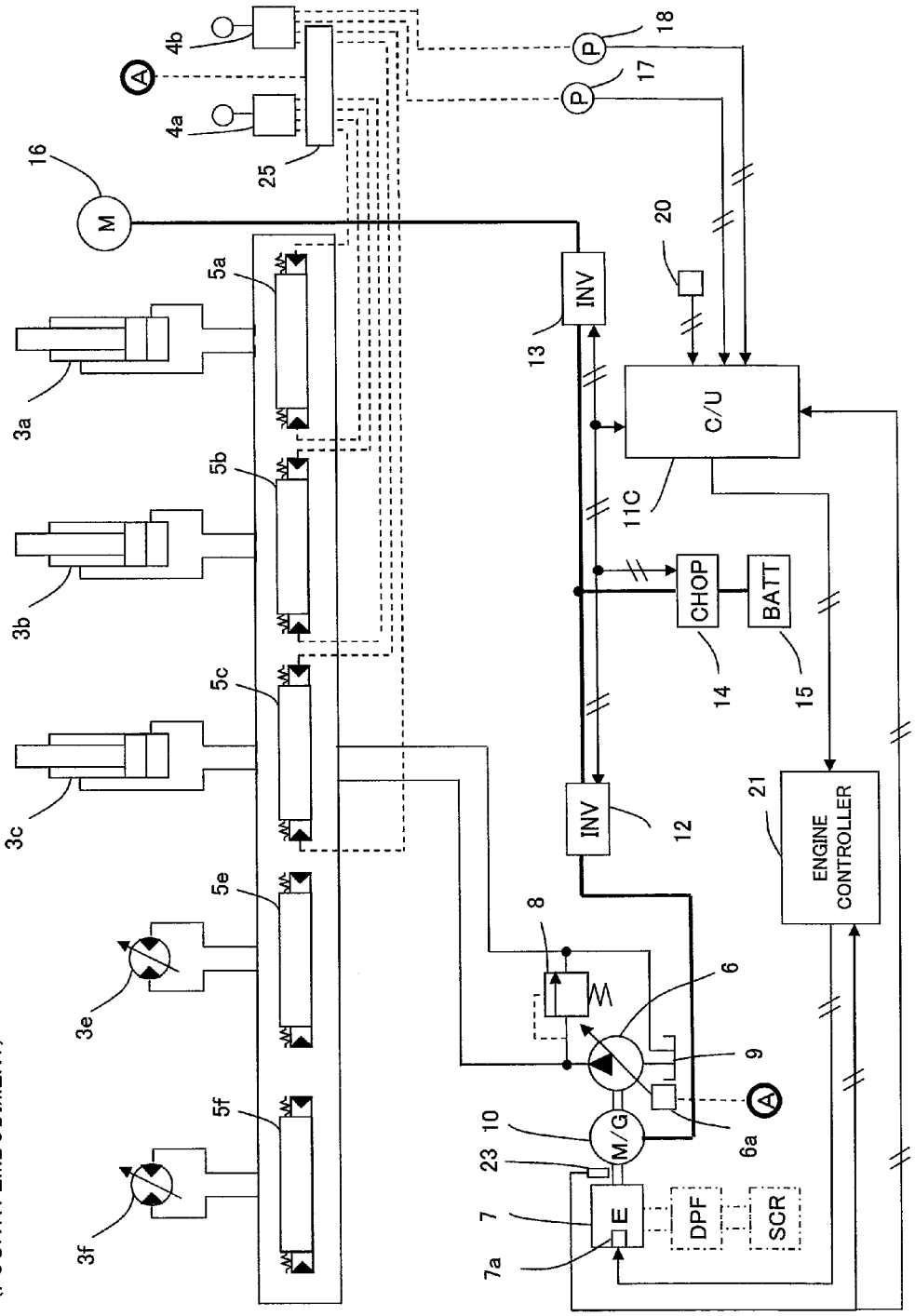
FIG. 19 is a block diagram of an actuator drive control system mounted on a hydraulic shovel as a fourth embodiment of the present invention.

FIG. 19 is a block diagram of an actuator drive control system of the fourth embodiment. In FIG. 19, the actuator drive control system of this embodiment does not have the torque sensor 19. Instead of the detection signal from the torque sensor 19, a detection signal from the revolution sensor 23 is input to a vehicle body controller 11C.

Figure 20:
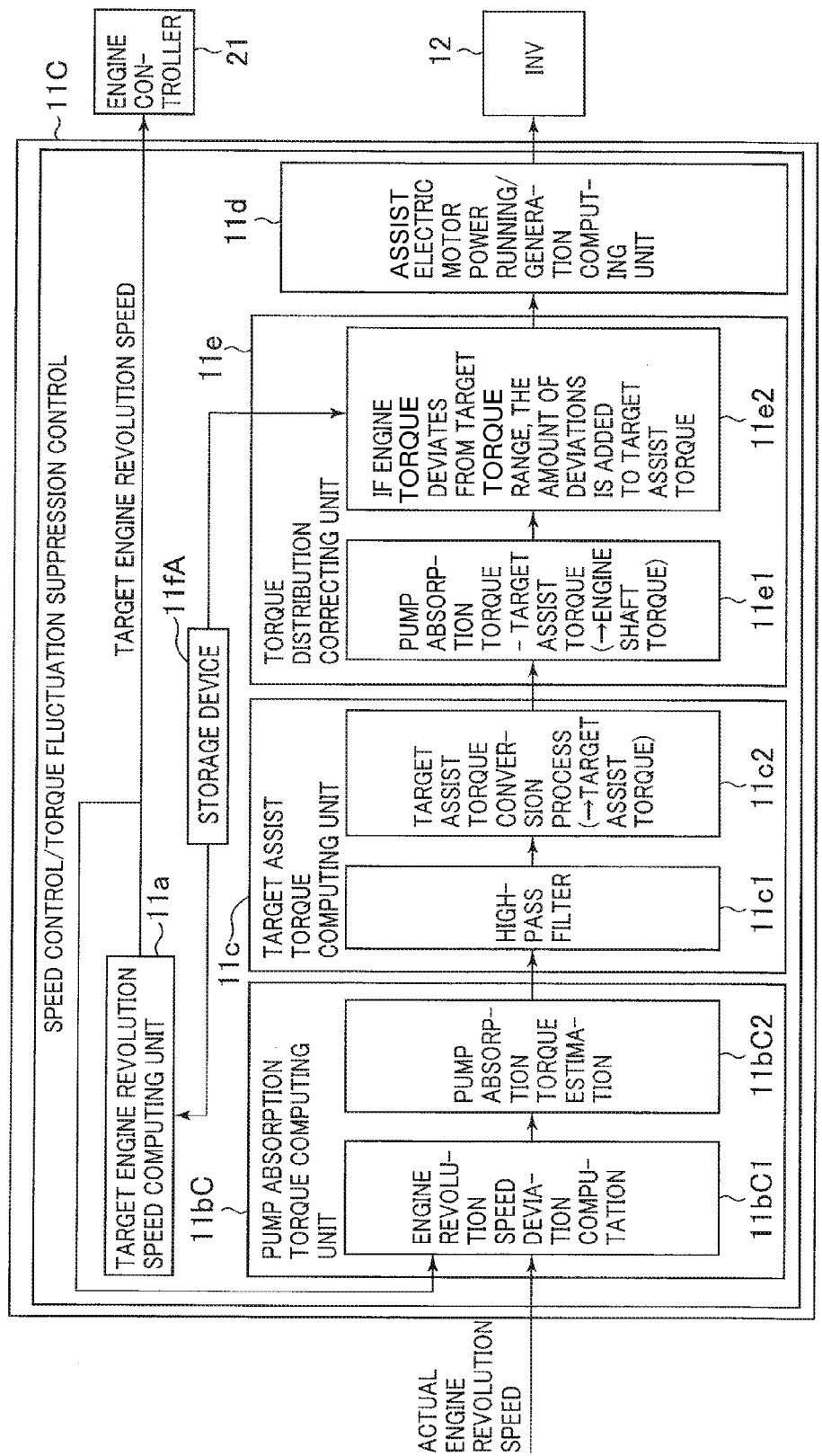
FIG. 20 is a function block diagram showing detailed processes of speed control and torque fluctuation suppression control performed by another vehicle body controller.

FIG. 20 is a function block diagram showing detailed processes of speed control and torque fluctuation suppression control performed by the vehicle body controller 11C of this embodiment.

The vehicle body controller 11C of this embodiment includes the functions composed of a target engine revolution speed computing unit 11a, a pump absorption torque computing unit 11bC, a target assist torque computing unit 11c, a torque distribution correcting unit 11e, and an assist electric motor power running/generation computing unit 11d; and a storage device 11fA.

The detailed processes and structures of the elements of this embodiment other than the pump absorption torque computing unit 11bC are the same as in the first and the second embodiments and thus will not be discussed further.

The pump absorption torque computing unit 11bC includes an engine revolution speed deviation computing unit 11bC1 and a pump absorption torque estimating unit 11bC2. The detection signal from the revolution sensor 23 is input to the engine revolution speed deviation computing unit 11bC1.

Figure 21:
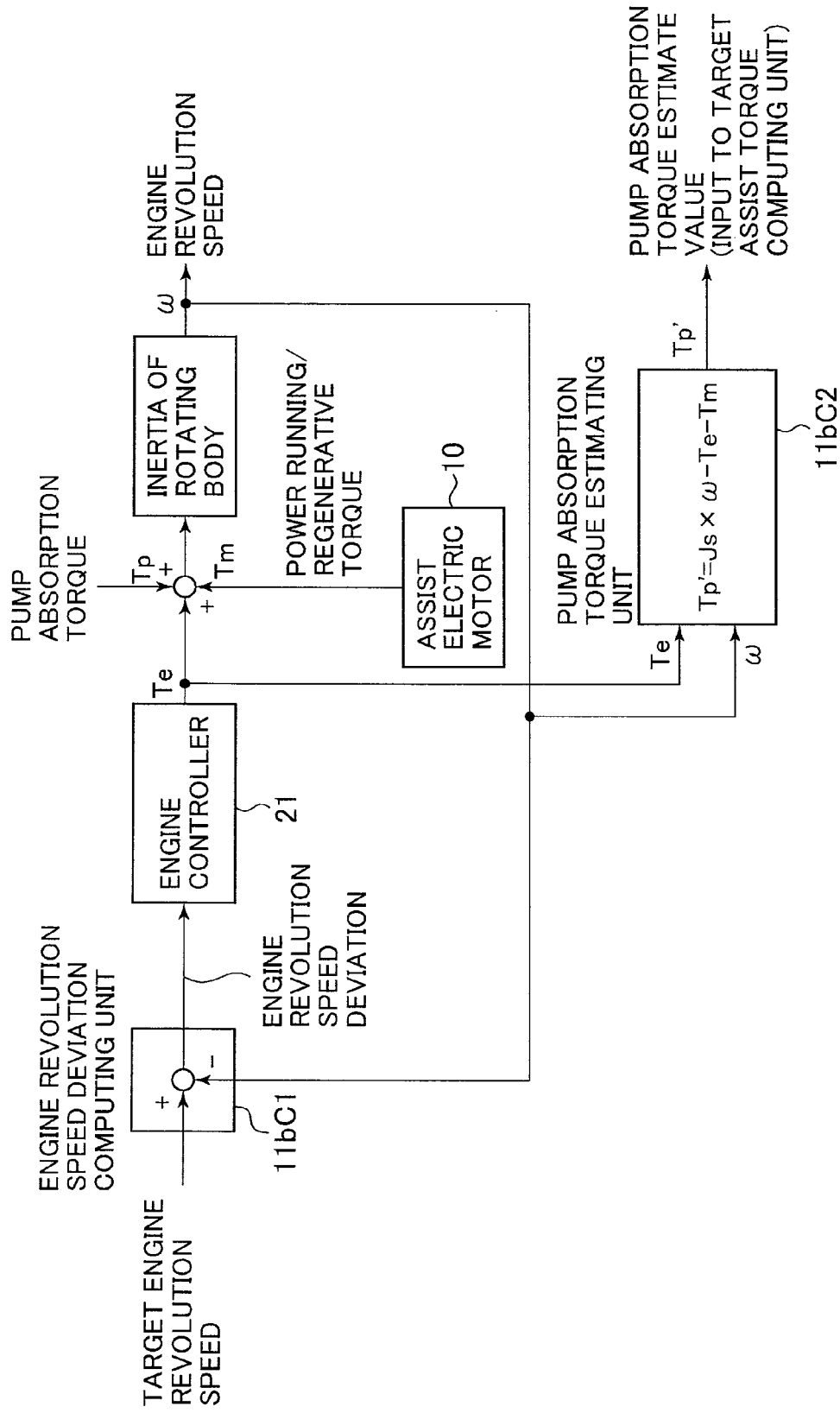
FIG. 21 is an illustration showing the concept of processing by an engine revolution deviation computing unit and a pump absorption torque estimating unit.

FIG. 21 is an illustration showing the concept of processing by the engine revolution speed deviation computing unit 11bC1 and pump absorption torque estimating unit 11bC2.

First, the engine revolution speed deviation computing unit 11bC1 computes an engine revolution speed deviation that is the difference between the target engine revolution speed and the actual engine revolution speed. The target engine revolution speed is input from the target engine revolution speed computing unit 11a. The actual engine revolution speed is a detected value of the revolution sensor 23.

The engine revolution speed deviation computed by the engine revolution speed deviation computing unit 11bC1 is input to the engine controller 21. The engine controller 21 computes the target fuel injection amount in such a manner as to reduce the engine revolution speed deviation, and outputs a control signal corresponding to the computed amount to the electronic governor 7a attached to the engine 7. The electronic governor 7a acting on that control signal injects as much fuel as the target fuel injection amount. This controls the engine to remain at the target revolution speed and also adjusts the output torque of the engine 7.

In addition to the output torque Te of the engine 7, a rotating body composed of the engine 7, assist electric motor 10 and hydraulic pump 6 is subject to the load torque Tp of the hydraulic pump 6 (pump absorption torque) and to power running or regenerative torque Tm of the assist electric motor 10 controlled by the inverter 12, whereby the rotating body is accelerated or decelerated. The engine 7, assist electric motor 10, and hydraulic pump 6 constituting the rotating body share a rotary shaft. The revolution speed ω of the rotating body represents the actual engine revolution speed. This actual engine revolution speed is fed back to the engine controller 21 as the engine revolution speed deviation. Because the torque of the rotating body in the accelerating direction is defined as positive in FIG. 21, the pump absorption torque Tp is negative, and the torque Tm of the assist electric motor 10 is positive during power running and negative during power regeneration.

First, consider the case where the pump absorption torque Tp and the power running or regenerative torque Tm of the assist electric motor 10 are 0. When the rotating body is approximated by inertia J, the speed ω of the rotating body when the engine torque Te is applied is expressed as ω=(1/Js)×Te, where "s" represents differential. Conversely, an estimate value Te' of the applied engine torque Te can be expressed as Te'=Js×ω based on the speed of the rotating body. The estimate value Te' thus becomes close to the actual engine torque Te.

Where Tp and Tm are not 0, the speed ω is affected thereby. It follows that Te' becomes a value including Tp and Tm resulting in a divergence from Te. That is, Tp and Tm represent the difference between the actual engine torque Te and the engine torque Te' estimated from the speed. When these relations are put together with respect to the pump absorption torque, the pump absorption torque can be expressed as Tp'=Js×ω−Te−Tm. It should be noted that differential is approximated by the difference or by a difference with a low-pass filter in consideration of noise and other factors.

Here, the engine torque Te is obtained as follows. The engine controller 21 adjusts the output torque of the engine 7 by computing the target fuel injection amount for the engine 7 and by causing the electronic governor 7a to increase or decrease the fuel injection amount accordingly. The fuel injection amount is substantially proportional to output torque. Thus the engine torque Te is obtained from the target fuel injection amount computed by the engine controller 21. Also, the power running or regenerative torque Tm of the assist electric motor 10 is computed by the vehicle body controller 11C in control of the inverter 12. The speed co of the rotating body is equal to the actual engine revolution speed and is constituted by the value detected by the revolution sensor 23. The inertia J of the rotating body is a known value.

The pump absorption torque estimating unit 11bC2 obtains the engine torque Te from the target fuel injection amount computed by the engine controller 21, and estimates the pump absorption torque Tp' by computing Tp'=Js×ω−Te−Tm using the power running or regenerative torque Tm of the assist electric motor 10 computed internally by the vehicle body controller 11C, the actual engine revolution speed ω as the detected value of the revolution sensor 23, and the inertia J of the rotating body as a known value.

With this embodiment, the pump absorption torque is computed using an existing revolution sensor in place of the torque sensor, so that the system can be configured inexpensively.

Fifth Embodiment

The fifth embodiment of the present invention is explained below in reference to FIGS. 22 through 24. This embodiment represents yet another method for computing pump absorption torque.

Figure 22:
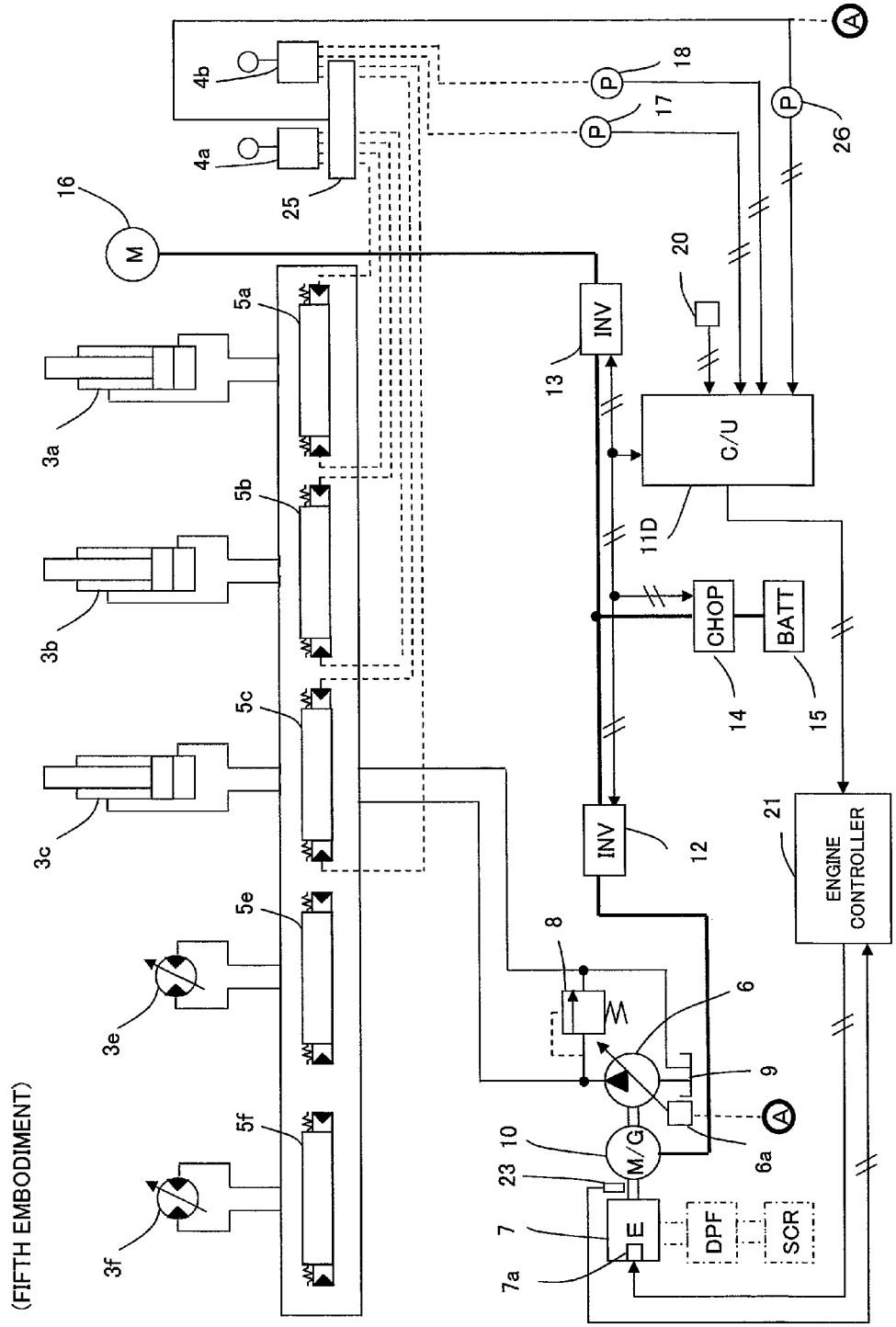
FIG. 22 is a block diagram of an actuator drive control system as a fifth embodiment of the present invention.

FIG. 22 is a block diagram of an actuator drive control system as the fifth embodiment. In FIG. 22, the actuator drive control system of this embodiment includes a shuttle valve block 25 and a pressure sensor 26 in place of the torque sensor 19, with a detection signal of the pressure sensor 26 input to a vehicle body controller 11D.

Figure 23:
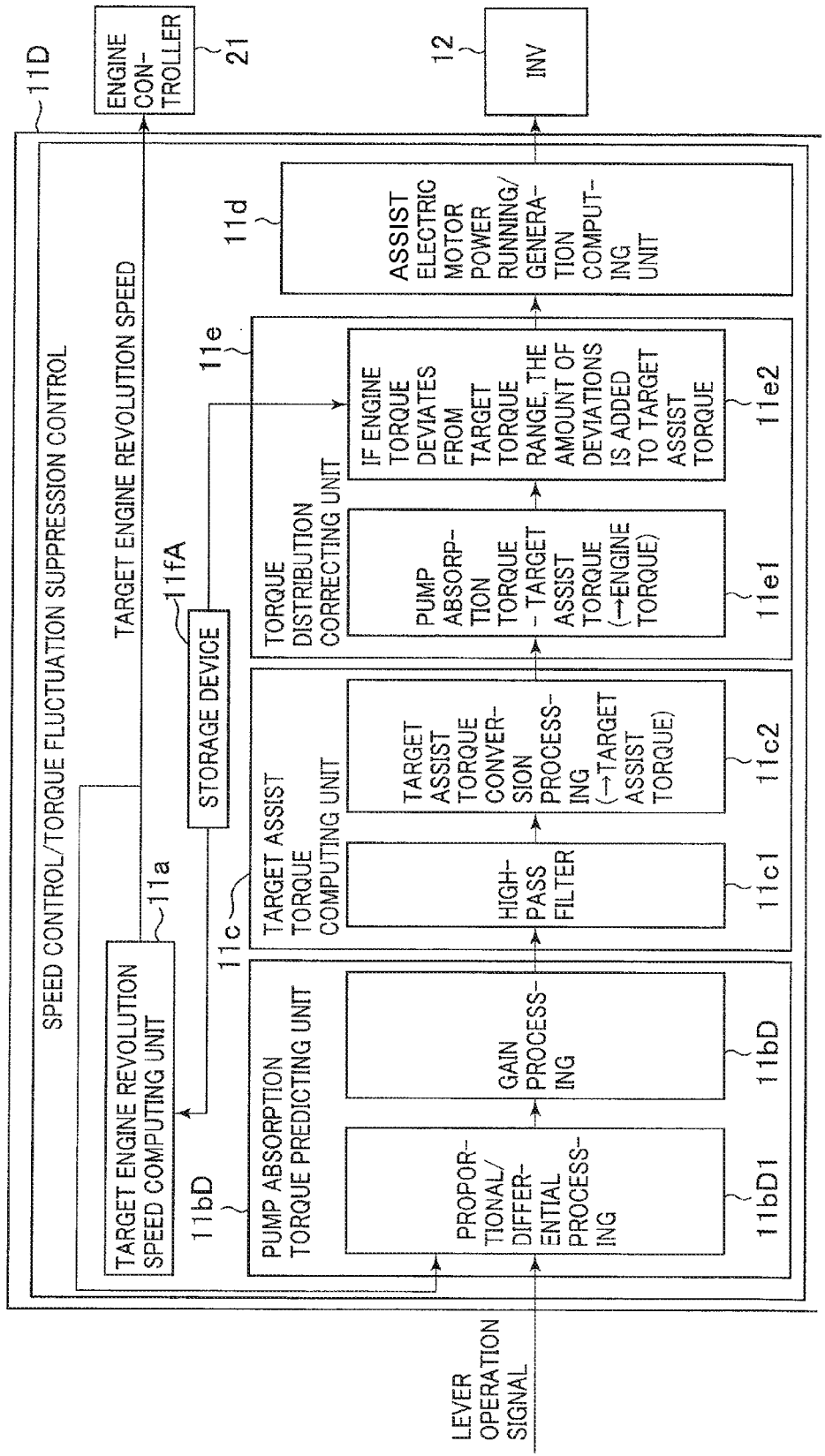
FIG. 23 is a function block diagram showing detailed processes of speed control and torque fluctuation suppression control performed by another vehicle body controller.

FIG. 23 is a function block diagram showing detailed processes of speed control and torque fluctuation suppression control performed by the vehicle body controller 11D of this embodiment.

The vehicle body controller 11D of this embodiment includes the functions composed of a target engine revolution speed computing unit 11a, a pump absorption torque predicting unit 11bD, a target assist torque computing unit 11c, a torque distribution correcting unit 11e, and an assist electric motor power running/generation computing unit 11d; and a storage device 11fA.

The detailed processes and structures of the elements of this embodiment other than the pump absorption torque predicting unit 11bD are the same as in the first and the second embodiments and thus will not be discussed further.

The pump absorption torque predicting unit 11bD includes a proportional differential processing unit 11bD1 and a gain processing unit 11bD2. The detection signal of the pressure sensor 26 is input to the proportional differential processing unit 11bD1.

Figure 24:
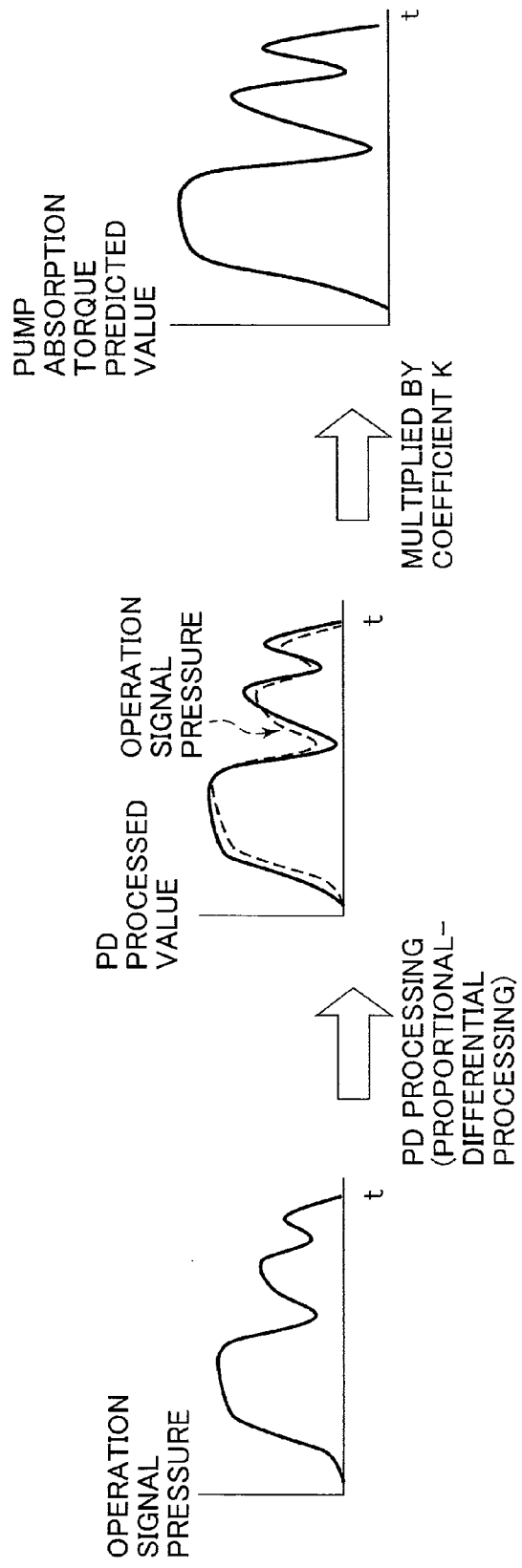
FIG. 24 is an illustration showing the concept of processing by a proportional differential processing unit and a gain processing unit.

FIG. 24 is an illustration showing the concept of processing by the proportional differential processing unit 11bD1 and gain processing unit 11bD2.

The proportional differential processing unit 11bD1 corrects an error stemming from the inertia of a driven body of the actuator drive control system, by adding a differential component to the output pressure (hydraulic operation signal of the highest pressure) of the shuttle valve block 25 which is the detected value of the pressure sensor 26. The gain processing unit 11bD2 obtains a predicted value of the pump absorption torque by multiplying a proportional differential process value of the hydraulic operation signal by a predetermined gain K.

Where the regulator 6a acting as the control device of the hydraulic pump 6 operates on the positive or negative control method, an increasing amount of operation of the control lever devices 4a and 4b or of the operating member of the control penal device raises the delivery flow rate of the hydraulic pump 6. In keeping with the load bearing on the driven member at this time (load of the front device 1A or of the lower track structure 1e), the pump absorption torque as the load torque of the hydraulic pump 6 rises. The magnitude of the load on that driven member is affected by the inertia of the driven member. Thus when the correction is made by adding the differential component to the hydraulic operation signal generated by the control lever devices 4a and 4b or control pedal devices, it is possible to predict the value substantially proportional to the pump absorption torque.

With this embodiment, the pump absorption torque is predicted using a pressure sensor available for general-purpose use in place of the torque sensor, so that the system can be configured inexpensively.

Sixth Embodiment

The sixth embodiment of the present invention is explained below in reference to FIGS. 25 through 27. This embodiment involves utilizing the output torque of the engine in place of the load torque bearing on the engine and performing control in such a manner that that output torque becomes the target output torque for the engine.

Figure 25:
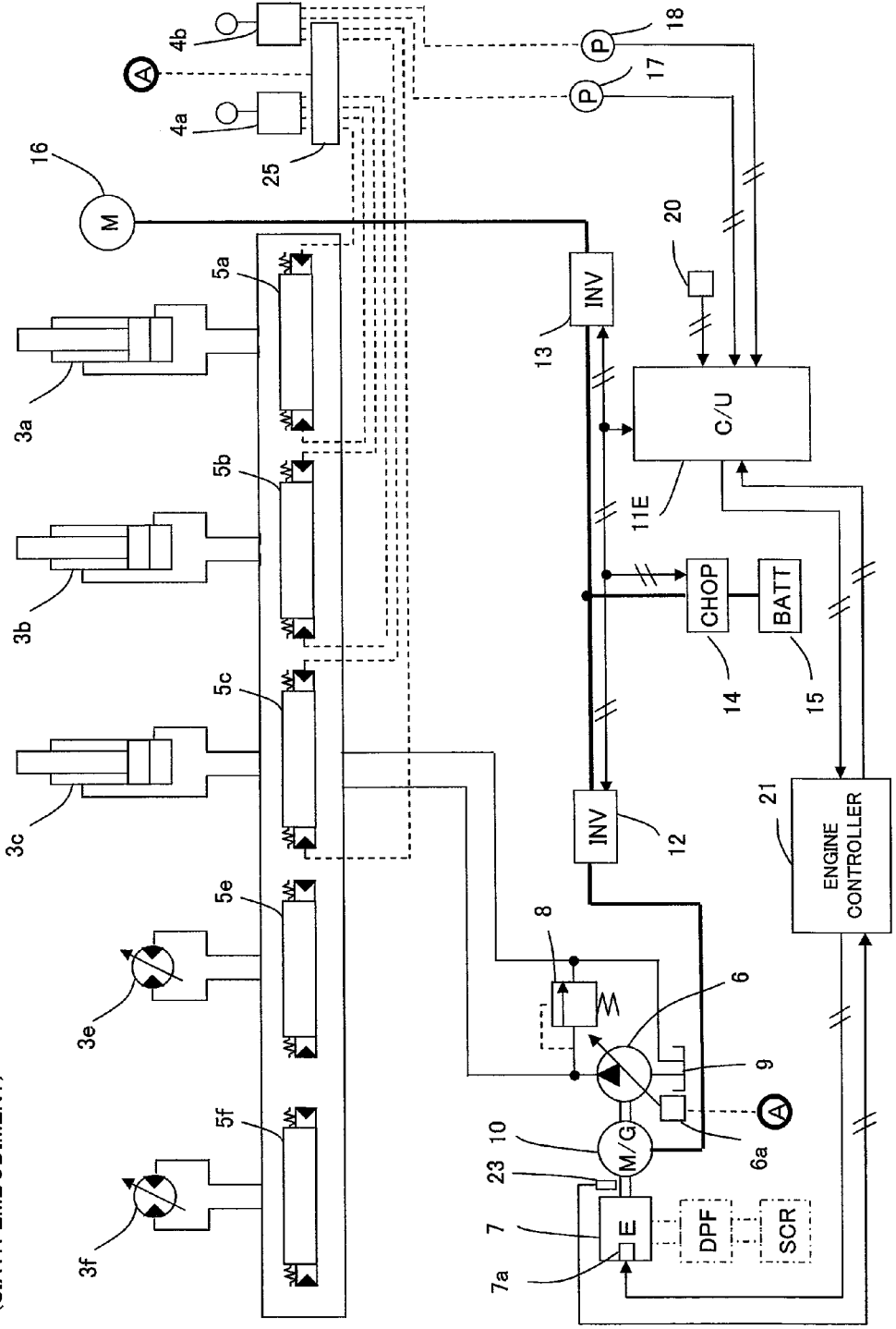
FIG. 25 is a block diagram of an actuator drive control system mounted on a hydraulic shovel as a sixth embodiment of the present invention.

FIG. 25 is a block diagram of an actuator drive control system of the sixth embodiment. In FIG. 25, the actuator drive control system of this embodiment is not provided with the torque sensor 19, and a detection signal of the revolution sensor 23, in place of that of the torque sensor 19, is input to a vehicle body controller 11E. Also, a signal of the target fuel injection amount internally computed by the engine controller 21 is input therefrom to the vehicle body controller 11E.

Figure 26:
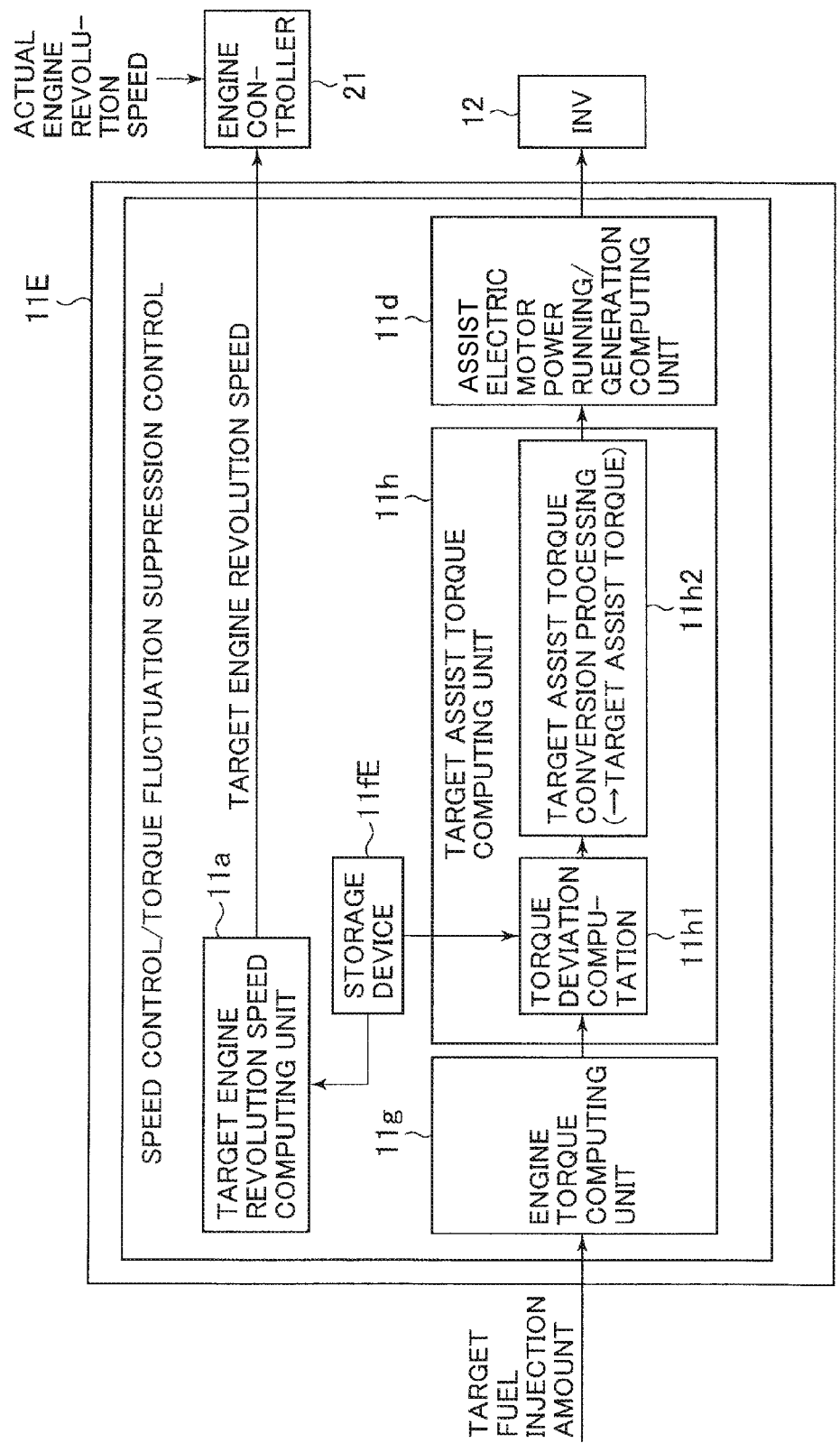
FIG. 26 is a function block diagram showing detailed processes of speed control and torque fluctuation suppression control performed by another vehicle body controller.

FIG. 26 is a function block diagram showing detailed processes of speed control and torque fluctuation suppression control performed by the vehicle body controller 11E of the sixth embodiment.

The vehicle body controller 11E of this embodiment includes the functions composed of a target engine revolution speed computing unit 11a, an engine torque computing unit 11g, a target assist torque computing unit 11h, and an assist electric motor power running/generation computing unit 11d; and a storage device 11fE.

The storage device 11fE stores an engine revolution speed Nep and output torque Tep as a specific engine revolution speed and specific engine output torque suitable for reducing the emissions of particulate matter (PM) contained in the exhaust gas from the engine 7, for example.

Figure 27:
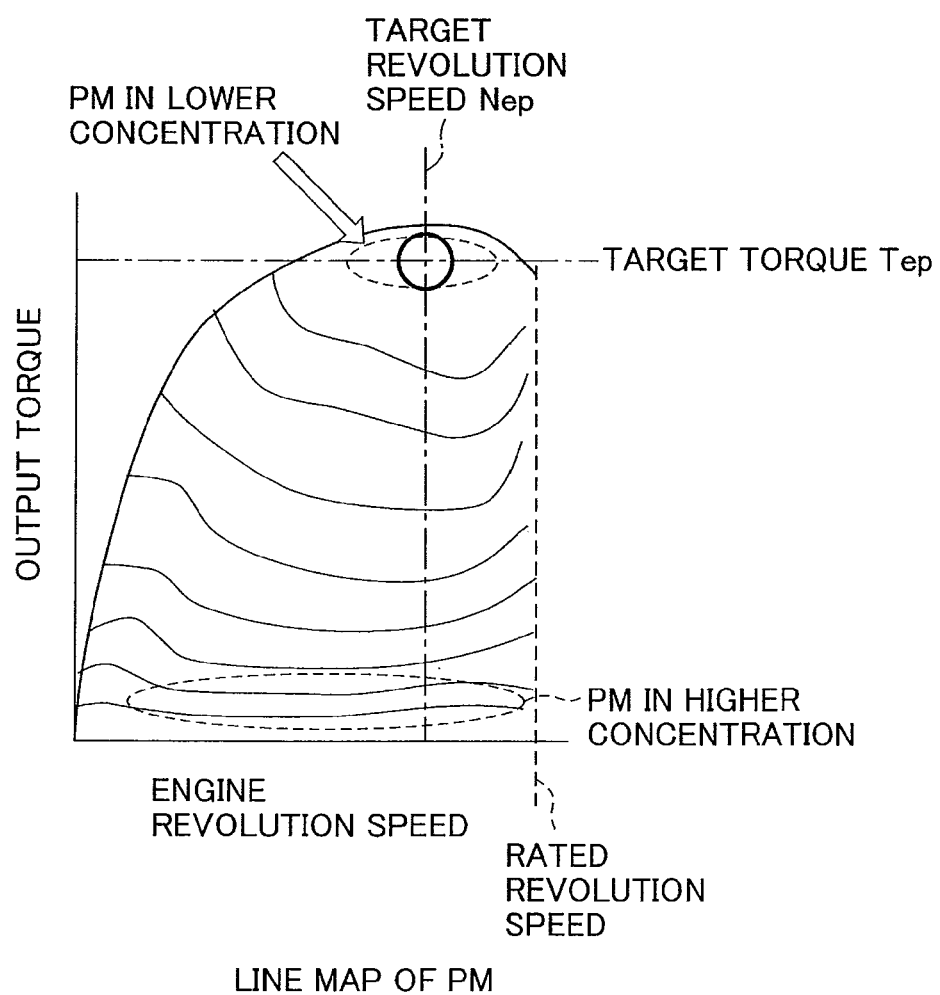
FIG. 27 is a diagrammatic view showing a line map of the emissions of particulate matter (PM) contained in the exhaust gas from the engine, the map representing the correlations between the revolution speed and output torque of the engine.

FIG. 27 is a diagrammatic view showing a line map of particulate matter (PM) contained in the exhaust gas from the engine 7, the map representing the correlations between the revolution speed and output torque of the engine 7. As shown in FIG. 27, the engine revolution speed Nep and output torque Tep stored in the storage device 11fE are set to a circular region in which the emissions of PM are the lowest.

The target engine revolution speed computing unit 11a reads the engine revolution speed Nep from the storage device 11fE, sets the retrieved speed as the target revolution speed for the engine 7, and outputs the set value to the engine controller 21. As described above, the engine controller 21 computes the deviation between the target revolution speed and the actual revolution speed of the engine 7 detected by the revolution sensor 23, computes a target fuel injection amount corresponding to the computed deviation, and outputs a control signal reflecting the computed amount to the electronic governor 7a to perform control so that the revolution speed of the engine 7 is maintained at its target revolution speed.

The engine torque computing unit 11g receives the signal of the target fuel injection amount computed internally by the engine controller 21 and, based on the target fuel injection amount thus input, computes the output torque of the engine 7.

The target assist torque computing unit 11h includes a torque deviation computing unit 11h1 and a target assist torque conversion processing unit 11h2. The torque deviation computing unit 11h1 reads the engine output torque Tep from the storage device 11fE as the target output torque for the engine 7, and computes a torque deviation by subtracting from the target output torque Tep the engine output torque computed by the engine torque computing unit 11g. The target assist torque conversion processing unit 11h2 calculates the target assist torque for the assist electric motor 10 based on the torque deviation computed by the torque deviation computing unit 11h1.

The assist electric motor power running/generation computing unit 11d computes the power running/generation output to be ordered to the assist electric motor 10 in accordance with the power running/generation values of the target assist torque for the assist electric motor 10 obtained by the assist torque conversion processing unit 11h2 of the target assist torque computing unit 11h, and sends a corresponding control signal to the inverter 12 to perform power running/generation control of the assist electric motor 10.

With this embodiment structured as described above, a specific engine revolution speed Nep and specific engine output torque Tep are also predetermined which are suitable for reducing the emissions of particulate matter (PM) as air pollutants contained in the exhaust gas from the engine 7. Control is then performed in such a manner that the specific engine revolution speed Nep and specific engine output torque Tep become the target engine revolution speed and target engine output torque, respectively. This allows the revolution speed and output torque of the engine 7 to be controlled to minimize the emissions of PM shown in FIG. 27, whereby the emissions of PM can be suppressed.

With the sixth embodiment, the target revolution speed and output torque of the engine 7 are set to the engine revolution speed Nep and engine output torque Tep in the region in which the emissions of PM are the lowest. Alternatively, as with the variations of the above-described second embodiment, the engine revolution speed and output torque may be set to the regions in which the total emissions of PM and NOx, the combination of the emissions of PM with the fuel consumption of the engine 7, the combination of the emissions of NOx with the fuel consumption, the combination of the total emissions of PM and NOx with the fuel consumption, or the emissions of NOx are the lowest. Also, as with the above-described third embodiment, all these engine revolution speeds and output torque ranges may be stored into the storage device, and the mode selector switch may be provided to select an optimum engine revolution speed and an optimum power torque output range from the stored settings.

<Others>

The first through the sixth embodiments described above are not limitative of the present invention, and many other variations and modifications of the invention are possible. For example, although the actuators for driving the swing structure on the vehicle body were described above as constituting the motor-driven swing system, it is also possible to adopt a system using ordinary hydraulic swing motors. Although a single target engine revolution speed was shown above to be set, it is also possible to set a plurality of target engine revolution speeds of which a suitable one is selected for control depending on the work details, work conditions, and user settings of the hydraulic working machine. Although the control lever device was shown above to output the hydraulic operation signal, it is also possible to have an electric signal output instead. Although the electric motor was shown above to be connected serially between the engine and the hydraulic pump, it is also possible to connect the hydraulic pump and electric motor in parallel with the engine via a gear mechanism. Although the load torque of the hydraulic pump (pump absorption torque) was shown above to be subjected to high-pass filter processing, it is also possible to subject the pump absorption torque to low-pass filter processing and subtract the filter-processed value (trend component) from the pump absorption torque in order to obtain the high-frequency component. When the trend component and high-frequency component of the load torque of the hydraulic pump are to be computed, it is also possible to perform feed-forward control in combination whereby such processes as differentiation are carried out on the computed values a number of computing cycles earlier so as to predict future values. Furthermore, the present invention can be applied not only to hydraulic shovels but also to other hydraulic working machines such as wheel loaders, traveling cranes, and bulldozers.

DESCRIPTION OF REFERENCE NUMERALS

3a Boom cylinder
3b Arm cylinder
3c Bucket cylinder
3e, 3f Right-hand and left-hand track motors
4a, 4b Control lever devices
5a to 5c, 5e, 5f Directional control valves 6 Hydraulic pump
6a Regulator
7 Engine
7a Electronic governor
8 Relief valve
9 Tank
10 Assist electric motor
11 Vehicle body controller
11a Target engine revolution speed computing unit
11b Pump absorption torque computing unit
11c Target assist torque computing unit
11c1 High-pass filter processing unit
11c2 Target assist torque conversion processing unit
11d Assist electric motor power running/generation computing unit
11f Storage device
11A Vehicle body controller
11e Torque distribution correcting unit
11e1 Engine output torque computing unit
11e2 Target assist torque correcting unit
11fA Storage device
11B Vehicle body controller
11aB Target engine revolution speed computing unit
11fB Storage device
11eB Torque distribution correcting unit
11e2B Target assist torque correcting unit
11C Vehicle body controller
11bC Pump absorption torque computing unit
11bC1 Engine revolution speed deviation computing unit
11bC2 Pump absorption torque estimating unit
11D Vehicle body controller
11bD Pump absorption torque predicting unit
11bD1 Proportional differential processing unit
11bD2 Gain processing unit
11E Vehicle body controller
11fE Storage device
11g Engine torque computing unit
11h Target assist torque computing unit
11h1 Torque deviation computing unit
11h2 Target assist torque conversion processing unit
12, 13 Inverters
14 Chopper
15 Battery
16 Swing motor
17, 18 Pressure sensors
19 Torque sensor
20 Engine control dial
21 Engine controller
22 Mode selector switch
23 Revolution sensor
26 Pressure sensor

The invention claimed is:

1. A hybrid-driven hydraulic working machine comprising:
an engine;
a hydraulic pump driven rotatably by said engine;
an assist electric motor connected to said engine and said hydraulic pump;
a plurality of actuators driven by hydraulic fluid delivered by said hydraulic pump;
a plurality of operating devices each having an operating member, said operating devices operating said actuators by outputting an operation signal reflecting the operation of said operating member;
a storage device that stores a specific revolution speed of said engine suitable for reducing the emissions of air pollutants contained in exhaust gas from said engine;
an engine revolution speed setting device that sets said specific revolution speed stored in said storage device as a target revolution speed for said engine;
an engine revolution speed control device that controls the revolution speed of said engine based on said target revolution speed for said engine, and
an electric motor control device that computes differential torque between the absorption torque of said hydraulic pump and target output torque of said engine and that subjects said assist electric motor to power running control and generation control in accordance with the differential torque,
wherein said electric motor control device includes:
a pump absorption torque acquiring device that acquires the absorption torque of said hydraulic pump, and
a filter device that separates the absorption torque of said hydraulic pump acquired by said pump absorption torque acquiring device into a trend component as target torque for said engine and other component, and
wherein said electric motor control device uses said other component separated by said filter device as said differential torque, and subjects said assist electric motor to power running control and generation control in such a manner that said trend component serves as the target output torque for said engine.

2. The hybrid-driven hydraulic working machine according to claim 1, wherein said filter device is a high-pass filter that removes said trend component from the absorption torque of said hydraulic pump acquired by said pump absorption torque acquiring device.

3. The hybrid-driven hydraulic working machine according to claim 1, wherein said storage device stores a specific revolution speed and a specific output torque range of said engine suitable for reducing the emissions of air pollutants contained in the exhaust gas from said engine;
wherein said electric motor control device further includes a torque distribution correcting device that corrects the target torque for said assist electric motor in such a manner that the target output torque for said engine does not exceed said specific output torque range stored in said storage device, and
wherein said electric motor control device subjects said assist electric motor to power running control and generation control based on the target torque for said assist electric motor corrected by said torque distribution correcting device.

4. The hybrid-driven hydraulic working machine according to claim 3, wherein the exhaust gas from said engine contains particulate matter (PM) and nitrogen oxides, and said storage device stores a plurality of combinations of said specific revolution speed and said specific output torque range of said engine suitable for reducing at least two of a plurality of factors including the emissions of particulate matter (PM), the emissions of nitrogen oxides (NOx), the total emissions of particulate matter (PM) and nitrogen oxides (NOx), a combination of the emissions of particulate matter (PM) with fuel consumption, a combination of the emissions of nitrogen oxides (NOx) with fuel consumption, and a combination of the total emissions of particulate matter (PM) and nitrogen oxides (NOx) with fuel consumption;
wherein said hydraulic working machine further includes a switching device that selects for use one of the combinations of said specific revolution speed and said specific output torque range of said engine;
wherein said engine revolution speed setting device sets said specific revolution speed of the combination selected by said switching device as said target revolution speed for said engine, and wherein said torque distribution correcting device corrects the target torque for said assist electric motor in such a manner that said specific output torque range of the combination selected by said switching device is not exceeded.

5. The hybrid-driven hydraulic working machine according to claim 3, wherein the exhaust gas from said engine contains particulate matter (PM) and nitrogen oxides, and said storage device stores a specific revolution speed of said engine, or a specific revolution speed and a specific output torque range of said engine suitable for reducing one of a plurality of factors including the emissions of particulate matter (PM), the emissions of nitrogen oxides (NOx), the total emissions of particulate matter (PM) and nitrogen oxides (NOx), a combination of the emissions of particulate matter (PM) with fuel consumption, a combination of the emissions of nitrogen oxides (NOx) with fuel consumption, and a combination of the total emissions of particulate matter (PM) and nitrogen oxides (NOx) with fuel consumption.

6. The hybrid-driven hydraulic working machine according to claim 1, wherein the exhaust gas from said engine contains particulate matter (PM) and nitrogen oxides, and said storage device stores a specific revolution speed of said engine, or a specific revolution speed and a specific output torque range of said engine suitable for reducing one of a plurality of factors including the emissions of particulate matter (PM), the emissions of nitrogen oxides (NOx), the total emissions of particulate matter (PM) and nitrogen oxides (NOx), a combination of the emissions of particulate matter (PM) with fuel consumption, a combination of the emissions of nitrogen oxides (NOx) with fuel consumption, and a combination of the total emissions of particulate matter (PM) and nitrogen oxides (NOx) with fuel consumption.

7. The hybrid-driven hydraulic working machine according to claim 1, wherein said pump absorption torque acquiring device includes:
   a torque detecting device that detects the absorption torque of said hydraulic pump; and
   a torque computing device that computes the absorption torque of said hydraulic pump based on detected values from said torque detecting device.

8. The hybrid-driven hydraulic working machine according to claim 1, wherein said pump absorption torque acquiring device includes:
   a revolution detecting device that detects the actual revolution speed of said engine; and
   a torque computing device that estimates the absorption torque of said hydraulic pump based on the deviation between said actual revolution speed detected by said revolution detecting device and said target revolution speed.

9. The hybrid-driven hydraulic working machine according to claim 1, wherein said pump absorption torque acquiring device includes:
   an operation signal detecting device that detects the operation signal output from said plurality of operating devices, and
   a torque computing device that predicts the absorption torque of said hydraulic pump based on said operation signal detected by said operation signal detecting device.

* * * * *